United States Patent
Sims et al.

(10) Patent No.: US 8,832,365 B1
(45) Date of Patent: Sep. 9, 2014

(54) SYSTEM, METHOD AND COMPUTER PROGRAM PRODUCT FOR A SELF-DESCRIBING TAPE THAT MAINTAINS METADATA OF A NON-TAPE FILE SYSTEM

(75) Inventors: Robert C. Sims, Round Rock, TX (US);
William H. Moody, II, Austin, TX (US);
Brian J. Bianchi, Cedar Park, TX (US);
Charles C. Young, Austin, TX (US);
Jeffrey R. Stripling, Austin, TX (US);
Gary McElroy, Austin, TX (US)

(73) Assignee: KIP CR P1 LP, New York, NY (US)

( * ) Notice: Subject to any disclaimer, the term of this patent is extended or adjusted under 35 U.S.C. 154(b) by 74 days.

(21) Appl. No.: 13/451,812

(22) Filed: Apr. 20, 2012

(51) Int. Cl.
G06F 12/00 (2006.01)
G06F 3/06 (2006.01)

(52) U.S. Cl.
CPC ............ *G06F 3/0686* (2013.01); *G06F 3/0619* (2013.01); *G06F 3/0643* (2013.01)
USPC ........................................................ 711/111

(58) Field of Classification Search
CPC .... G06F 3/0686; G06F 3/0643; G06F 3/0619
See application file for complete search history.

(56) References Cited

U.S. PATENT DOCUMENTS

| | | | |
|---|---|---|---|
| 5,488,702 A | 1/1996 | Byers | |
| 5,740,430 A | 4/1998 | Rosenberg et al. | |
| 6,463,513 B1 | 10/2002 | Bish et al. | |
| 6,502,165 B1 | 12/2002 | Kishi | |
| 7,266,556 B1 | 9/2007 | Coates | |
| 7,752,384 B2 | 7/2010 | Moody et al. | |
| 7,941,597 B2 | 5/2011 | Moody et al. | |
| 8,527,561 B1 | 9/2013 | Moody, II et al. | |
| 8,566,517 B1 | 10/2013 | Sims et al. | |
| 2005/0188246 A1 | 8/2005 | Emberty et al. | |
| 2007/0189708 A1 | 8/2007 | Lerman et al. | |
| 2009/0006543 A1 | 1/2009 | Smit | |
| 2009/0213482 A1 | 8/2009 | Fujihara | |
| 2010/0182887 A1 | 7/2010 | Moody | |
| 2012/0158882 A1* | 6/2012 | Oehme et al. .................. 709/213 |
| 2012/0179867 A1* | 7/2012 | Chakravarty et al. .......... 711/111 |
| 2012/0323934 A1 | 12/2012 | Amir et al. | |
| 2013/0132663 A1 | 5/2013 | Eleftheriou et al. | |
| 2013/0173548 A1 | 7/2013 | Haustein et al. | |

(Continued)

FOREIGN PATENT DOCUMENTS

WO    WO 00/43889 A1    7/2000

OTHER PUBLICATIONS

Linear Tape File System (LTFS) Format Specification, Mar. 11, 2011, pp. 46-50.*

(Continued)

*Primary Examiner* — April Y Blair
*Assistant Examiner* — Michael C Kolb
(74) *Attorney, Agent, or Firm* — Sprinkle IP Law Group

(57) ABSTRACT

Embodiments described herein provide systems and methods for a self-describing tape that allow files stored on a tape according to a tape file system to be presented in a similar manner (e.g., to an operating system, to a network file system interface) by different instances of a second type of file system (e.g., a non-tape file system). This can include, for example, allowing a file system of the second type to consistently present files over a network file system interface as being available at the same directory path location, according to the same permissions.

19 Claims, 21 Drawing Sheets

(56) References Cited

U.S. PATENT DOCUMENTS

2013/0290388 A1    10/2013    Lenox
2013/0311527 A1    11/2013    Moody, II et al.
2014/0164693 A1*    6/2014    Hasegawa et al. ............ 711/111

OTHER PUBLICATIONS

Notice of Allowance for U.S. Appl. No. 13/109,192, mailed Apr. 24, 2013, 5 pgs.

Office Action for U.S. Appl. No. 13/267,743, mailed Jun. 19, 2013, 26 pgs.

Pease, David, et al., "The Linear Tape File System," IBM Yamato Lab, 2010, 8 pages, #978-1-4244-7153-9/10, IEEE, U.S.

Linear Tape File System (LTFS) Format Specification, LTFS Format Version 2.0.0., Mar. 11, 2011, 69 pages, accessed on Sep. 29, 2011 at http://www.trustito.com/LTFS_Format_To%20Print.pdf.

Long Term File System Information Center 1.2.1.1, Overview, LTFS Format, IBM Corp., 2010, 1 pg.

HP Linear Tape File System (LTFS), HP OEM Newsletter, Sep. 2010, 15 pgs.

Anyone Using LTFS with LTO-5? Post, Reduser.net, Sep. 29, 2010, 3 pgs. at <<http://reduser.net/forum/showthread.php?t=50309>>.

Coolen, Ilja, IBM's Long Term Filesystem, short term usage? Apr. 26, 2010, 3 pgs. at <<http://www.iljacoolen.nl/2010/04/ibms-long-term-filesystem-short-term-usage/>>.

International Search Report and Written Opinion for International Patent No. PCT/US2013/038755, mailed Aug. 6, 2013, 10 pgs.

Official Action for U.S. Appl. No. 13/109,192 mailed Dec. 17, 2012, 10 pages.

Official Action for U.S. Appl. No. 13/267,743 mailed Dec. 19, 2012, 13 pages.

Office Action for U.S. Appl. No. 13/485,060, mailed Mar. 19, 2014, 7 pgs.

Notice of Allowance for U.S. Appl. No. 13/267,665, mailed Dec. 12, 2013, 6 pgs.

Office Action for U.S. Appl. No. 13/267,665 mailed Apr. 22, 2014, 12 pgs.

* cited by examiner

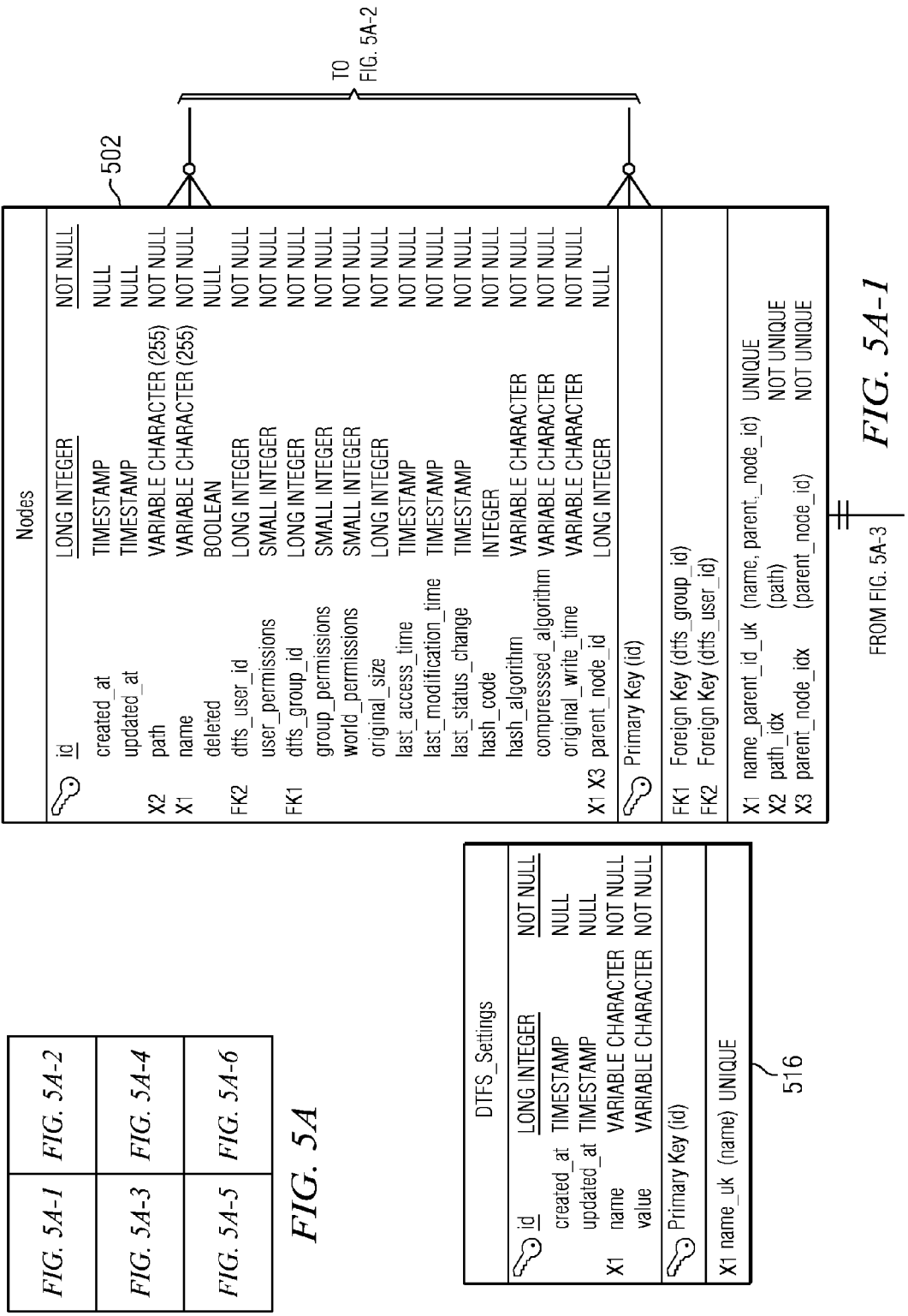

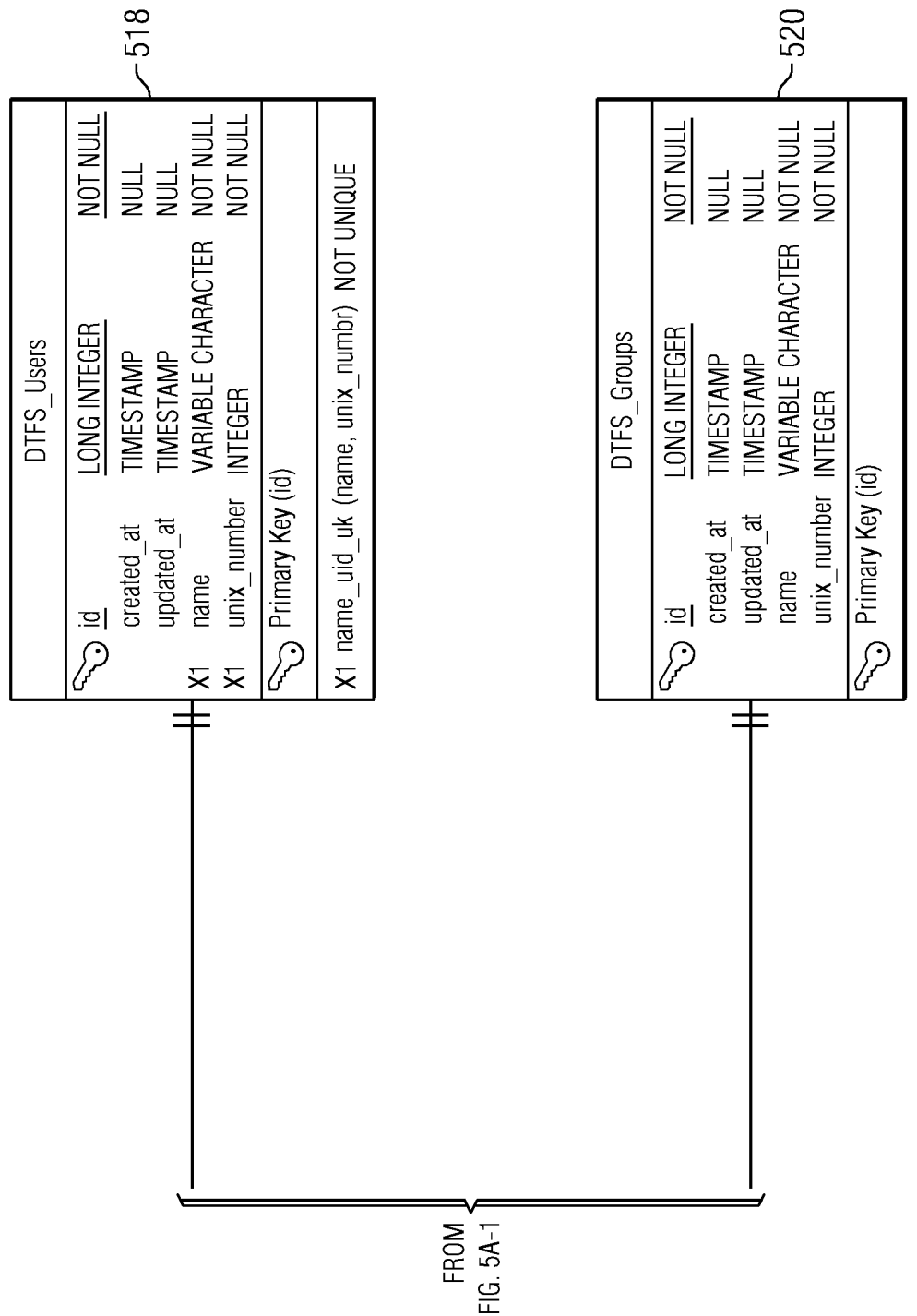

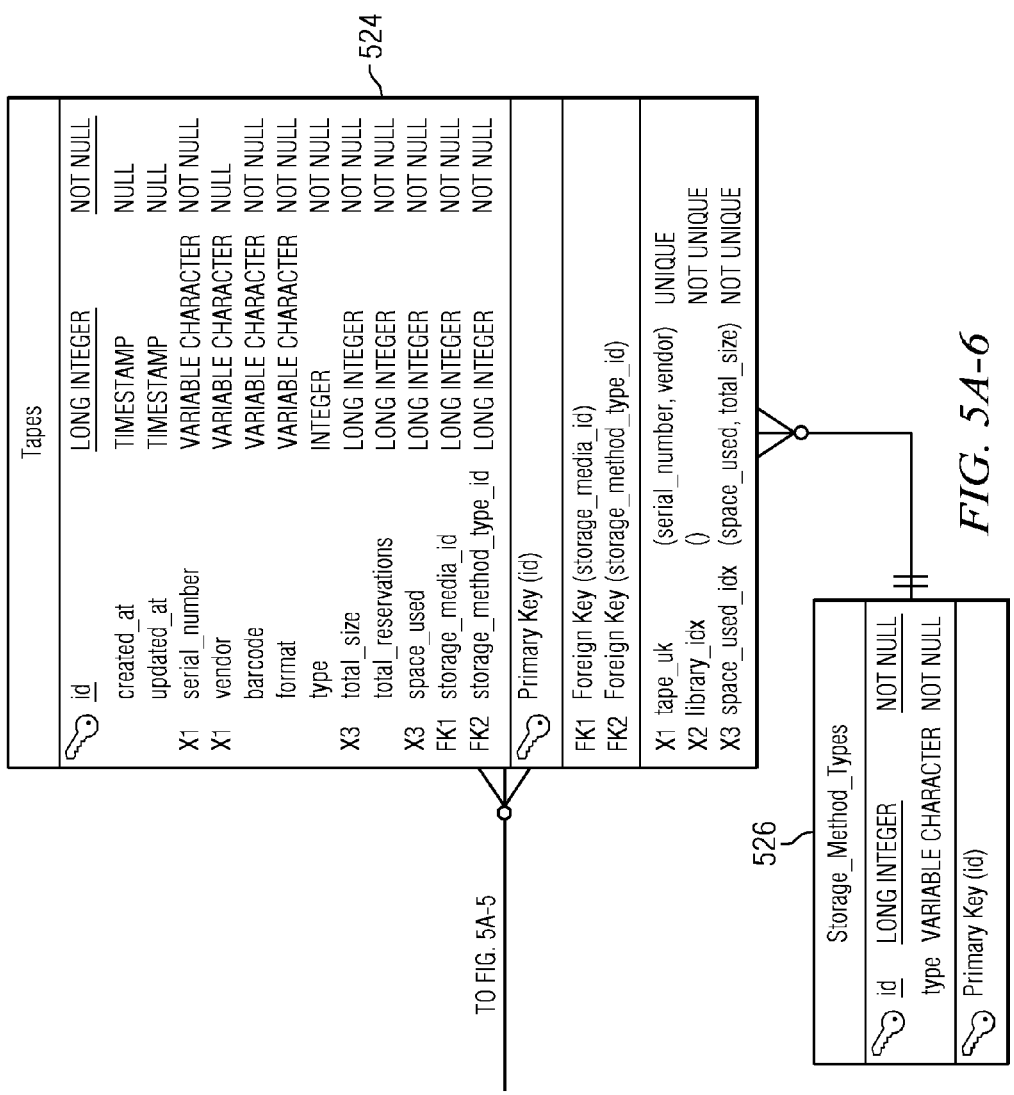

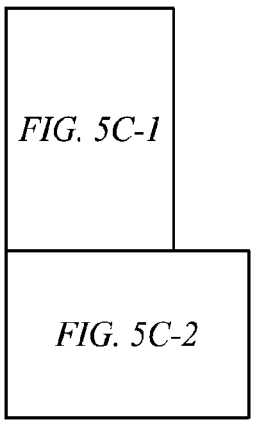

| Nodes | | | |
|---|---|---|---|
| 🔑 | id | LONG INTEGER | NOT NULL |
| | created_at | TIMESTAMP | NULL |
| | updated_at | TIMESTAMP | NULL |
| X2 | path | VARIABLE CHARACTER (255) | NOT NULL |
| X1 | name | VARIABLE CHARACTER (255) | NOT NULL |
| | deleted | BOOLEAN | NULL |
| FK2 | dtfs_user_id | LONG INTEGER | NOT NULL |
| | user_permissions | SMALL INTEGER | NOT NULL |
| FK1 | dtfs_group_id | LONG INTEGER | NOT NULL |
| | group_permissions | SMALL INTEGER | NOT NULL |
| | world_permissions | SMALL INTEGER | NOT NULL |
| | original_size | LONG INTEGER | NOT NULL |
| | last_access_time | TIMESTAMP | NOT NULL |
| | last_modification_time | TIMESTAMP | NOT NULL |
| | last_status_change | TIMESTAMP | NOT NULL |
| | hash_code | INTEGER | NOT NULL |
| | hash_algorithm | VARIABLE CHARACTER | NOT NULL |
| | compressed_algorithm | VARIABLE CHARACTER | NOT NULL |
| | original_write_drive | VARIABLE CHARACTER | NOT NULL |
| X1 X3 | parent_node_id | LONG INTEGER | NULL |
| 🗝 Primary Key (id) | | | |
| FK1 Foreign Key (dtfs_group_id) | | | |
| FK2 Foreign Key (dtfs_user_id) | | | |
| X1 name_parent_id_uk | (name, parent_node_id) | UNIQUE | |
| X2 path_idx | (path) | NOT UNIQUE | |
| X3 parent_node_idx | (parent_node_id) | NOT UNIQUE | |

FROM FIG. 5C-2

SYSTEM, METHOD AND COMPUTER PROGRAM PRODUCT FOR A SELF-DESCRIBING TAPE THAT MAINTAINS METADATA OF A NON-TAPE FILE SYSTEM

TECHNICAL FIELD

This disclosure relates to the field of data storage. More particularly, this disclosure relates to presenting files stored using a tape based file system to a network file system. Even more particularly, this disclosure relates to embodiments of systems for creating self-describing tapes that allow files on the tape stored according to a tape file system to presented consistently by other types of files systems.

BACKGROUND

Businesses, governmental organizations and other entities are increasingly saving large volumes of data necessary for daily operations. This data represents a significant asset for these entities. Consequently, data loss, whether accidental or caused by malicious activity, can be costly in terms of wasted manpower, loss of goodwill from customers, loss of time and potential legal liability. To ensure proper protection of data for business and legal purposes (e.g., to ensure quick recovery of data in the event of a disaster, to comply with document retention requirements, etc.), these entities often back up data to a physical media, such as magnetic tapes or optical disks on a regular basis.

Traditional backup systems placed an application server, backup server, source device, destination device and a local area network ("LAN") in the data path of backup operations. Under these systems, the LANs were becoming overburdened by the amount of data being copied. Often, the backup window (the period in which data unavailable for normal operations in order to permit backup) was too short to achieve a complete backup of data. Accordingly, many entities implemented Storage Area Networks ("SAN") to relieve the burden of mass data storage and backup from the LAN, freeing the LAN for more immediate data storage and manipulation operations. In SANs data from multiple machines on a network may be backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command to the robot and the robot moves the tape cartridge.

Recently, the Linear or Long Term File System (LTFS) Format Specification by IBM and Ultrium (hereby fully incorporated by reference in its entirety for all purposes) has been developed, which defines a file system for LTO-5 tapes, LTO-6 tapes and may be extended to other tapes using an eXtensible Markup Language (XML) schema architecture. This file system support allows the use of an LTFS-formatted tape as if it were a file system. Files and directories may appear in a directory listing, files may be dragged and dropped from tape, data may be accessed at the file level, etc. Consequently, while it previously was necessary to make use of a backup application to write and read tapes, the introduction of LTFS has simplified the storing and retrieval of files on tape by reducing such operations to a copy. Furthermore, any operating system that includes LTFS support can mount an LTFS formatted tape and read and write the files thereon.

However, LTFS does not provide an adequate mechanism for making the files on LTFS tapes available over a network nor does it provide a mechanism such that files on the tape are presented consistently if the LTFS tapes are transported from one system to another.

SUMMARY

Embodiments described herein provide systems and methods for a self-describing tape that allow files stored on a tape according to a tape file system to be presented in a similar manner (e.g., to an operating system, to a network file system interface) by different instances of a second type of file system (e.g., a non-tape file system). This can include, for example, allowing a file system of the second type to consistently present files over a network file system interface as being available at the same directory path location, according to the same permissions.

One embodiment described herein describes a system for providing a self-describing tape, where the system includes a media library and an archive node appliance coupled to the media library. The archive node appliance can comprise a processor, a data store and a set of computer instructions executable on the processor. The instructions may be executable to i) maintain, for a file, a set of first file system metadata according to a first type of file system; ii) present, as located at a first location and according to the set of first file system metadata, the file using a first file system of the first type of file system; iii) cause the file to be stored at a second location on a tape of a media library using a second file system of a second type of file system, wherein the second location mirrors the first location; iv) cause at least a portion of the set of first file system metadata to be stored on the tape in addition to a set of second file system metadata stored by to the second file system.

According to one embodiment, a system can cause file system metadata of the first file system to be stored on the tape in addition to metadata stored by the second file by setting extended attributes of the second file system. In another embodiment, the system can write a metadata file to the tape.

One embodiment of a method can comprise maintaining, for a file, a set of first file system metadata according to a first type of file system; presenting, as located at a first location and according to the set of first file system metadata, the file using a first file system of the first type of file system; causing the file to be stored at a second location on a tape of a media library using a second file system that is a second type of file system, wherein the second location mirrors the first location; causing at least a portion of the set of first file system metadata to be stored on the tape in addition to the set of second file system metadata stored by the second file system.

Embodiments described herein provide an advantage by allowing tape file system formatted tapes to be self-describing for non-tape file systems that may present out files on the tape.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
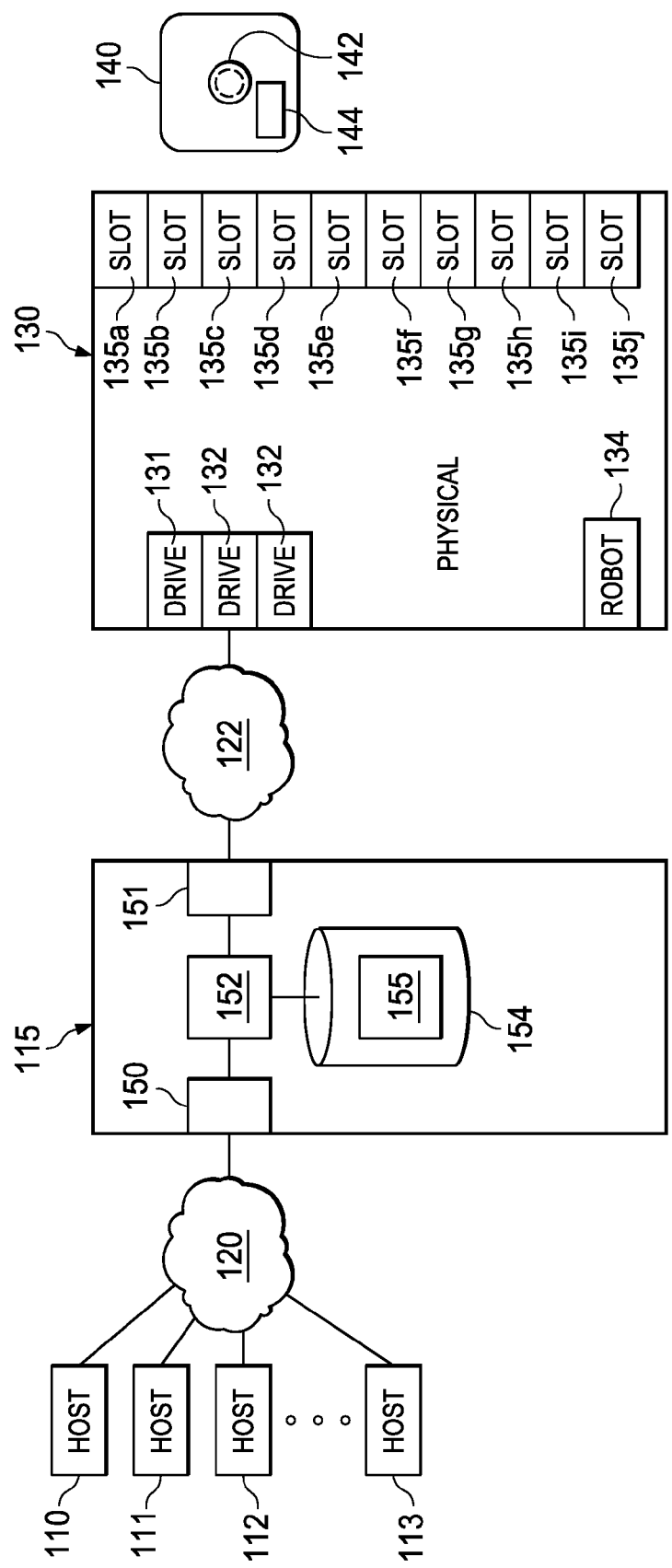
FIG. 1 is a diagrammatic representation of one embodiment of system comprising an Archive Node Appliance.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.) or the like. In various embodiments, the computer has access to at least one database.

ROM, RAM, and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

It will be recalled from the above discussion that in many instances it may be desired to provide a file system utilizing media libraries. To that end, attention is now directed to systems and methods for implementing a file system utilizing a tape library. In particular, embodiments may present a network based file system to one or more host devices. These host devices may utilize the network based file system to organize, store, read or perform other operations in association with files. These files may be managed in conjunction with a tape library. Specifically, commands in a network file system protocol may be received. These commands may be associated with operations to be performed on files, including operations associated with the organization, storage or retrieval of those files. Library control functionality that allows tapes in the tape library to be tracked and tapes to be moved into and out of drives and storage slots is utilized to manage the tape library.

In certain embodiments, LTFS (including Library LTFS) may be employed in conjunction with the tape library such that the tapes in the tape library may be formatted using LTFS. Accordingly, operations with respect to the files on the tapes in the tape library may be performed using LTFS. A mapping may be maintained between the files visible through the networked based file system presented to the host devices and the corresponding location of those files on an LTFS tape in the tape library. It should be noted here that while embodiments as discussed include a tape library having tapes formatted according to LTFS, other types of media libraries that utilize media of the same or different type where the media may be formatted according to the same or another type of file system may be employed in other embodiments.

To increase performance, embodiments of such a system may include a data store, which may be on a storage medium that is relatively faster for random accesses such as a disk. Files that are stored by the host devices using the networked based file system may initially be stored on the disk. These files are subsequently migrated to tapes in the tape library. Once a file has been migrated all, or a portion of, that file may be deleted from the disk. When a file is subsequently accessed it can be determined if the file is on the disk or stored on tape. The file can then be accessed from the disk, a tape or a combination of the two. File operations performed through the network file system can occur on files in the data store, rather than directly on the file on tape.

In some cases, it may be desirable to move a tape from one system to another and have the files on tape presented out in a similar manner by the second system as was done by the first system. Accordingly, embodiments provided herein can utilize self-describing tapes that allow the files read from the tape to be presented out similarly by multiple systems. The tape can store metadata of both the file system used to store files on the tape (e.g., LTFS) and the file system used to present out the files read from the tape to provide for consistent file descriptions between systems.

FIG. 1 is a diagrammatic representation of a system in which a media library is managed to present a network based file system to a plurality of hosts (i.e. host devices). Archive Node Appliance 115 can comprise one or more communications interfaces 150, 151 (e.g., fibre channel interface, Ethernet port or any other type of communication interface known in the art) to connect Archive Node Appliance 115 to network 120 and network 122. In this embodiment, hosts 110, 111, 112 and 113 are coupled to an Archive Node Appliance 115 via network 120. Network 120 can comprise the Internet, a LAN, a WAN, a SAN, a wireless network, or any other communications link, network or protocol known in the art. For example, network may comprise an Ethernet based network employing TCP/IP.

Archive Node Appliance 115 is coupled to media library 130 via network 122 (Archive Node Appliance 115 and media library 130 may be collectively referred to as an Archive Node or a Networked Attached Tape Archive (NATA)). Network 122 can comprise the Internet, a LAN, a WAN, a SAN, a wireless network, or any other communications link, network or protocol known in the art. For example, network 122 may comprise a fibre channel network (such as a fibre channel SAN) or a SCSI bus, such as a Serial Attached SCSI (SAS) bus. While Archive Node Appliance 115 has been depicted as a standalone device in this embodiment, it should be understood that Archive Node Appliance 115 can be implemented in a variety manners and in a variety of architectures. For example, when implemented in a SAN, the Archive Node Appliance may be part of a router, part of a media library or at any other location in a communication path between hosts and a media library.

Media library 130 may comprise a tape library or another media library known in the art such as optical jukeboxes. A tape library, as would be understood by one of ordinary skill in the art, typically consists of one or more tape drives that can read/write data from/to magnetic tape (contained within cartridges also referred to herein as tapes or tape cartridges), eject tape cartridges and perform other operations. A series of slots stores the tape cartridges when they are not in a drive and a robot moves the magnetic tape cartridges between the drives and slots.

As an example, media library 130 can comprise drives 131-133, robot 134 and slots 135 (individually slots 135a-j). Slots can hold tape cassettes, optical disks or other storage. One example of a cassette 140 is depicted. In some cases, a cassette 140 can include a magnetic tape medium 142 and media auxiliary memory (MAM) 144. It should be noted that a media library that employs a single robot or multiple robots in an expandable or modular configuration, but presents itself as a single media library to a network, or any other configuration of one or more media libraries, either physical or virtual, that can present itself as a single media library can be considered a single media library for the purposes of this application. It will also be noted that though the embodiment depicts only a single media library, other embodiments may be coupled to, and utilize, multiple media libraries.

Archive Node Appliance 115 comprises a computer processor 152 and a computer readable memory 154 (e.g. RAM, ROM, magnetic disk, optical disk and/or any other computer readable memory known in the art) that can store computer instructions 155 that are executable by processor 152. Computer instructions 155 can be implemented as hardware, software, firmware, some combination or in any other suitable manner as would be understood by those of ordinary skill in the art.

In operation, computer instructions 155 can be executable such that Archive Node Appliance 115 can present a network based file system (i.e. a file system accessible over a network) to hosts 110, 111, 112, 113, allowing these hosts to organize, store or retrieve files or perform other operations associated with a file system. Operations that can be performed using such network based files systems are understood by those of skill in the art. This network based file system may be for example, a Network File System (NFS) based file system, a Common Internet File System (CIFS) based file system, a File Transfer Protocol (FTP) based file system, a Secure Copy Protocol (SCP) based file system, a Representational State Transfer (REST) based file system, or a file system based on any another type of protocol which allows a file system to be accessed over a network.

Computer instructions 155 may thus be executable to implement operations associated with the presented network based file system in conjunction with media library 130. More specifically, in one embodiment, drives 131, 132, 133 may be LTO-5, LTO-6 compliant drives and tapes in media library 130 may be formatted according to LTFS (as disclosed in the Linear Tape File System Format Specification Version 2.0, or other version by IBM, hereby incorporated by reference in its entirety). In other embodiments the drives may be compliant with other types of tapes and the tapes may be formatted according to other tape file systems. Computer instructions 155 may be executable to store files received through the networked based file system on the LTFS tapes in the media library 130 and maintain mapping information between the files visible through the network based file system and the location of those files in the media library.

The files visible through the network based file system can be files stored at an intermediate location (e.g., a disk based data store or memory). When a file visible through the network based file system is accessed, computer instructions 155 can be executed to provide access to the file from the intermediate location. File operations can thus occur on the file at the intermediate location rather than directly on the file on the tape.

In some cases, the file may not reside entirely in the intermediate storage when the file is accessed. Therefore, the computer instructions 155 can also be executable to determine the location of the accessed file in the media library 130 using the mapping information, locate and load the correct tape into a drive, and use LTFS to mount the LTFS file system on the tape and access the file to, for example, read the remainder of the file into the intermediate storage.

To increase performance, in some embodiments, it may be desired to store files on computer readable memory 154 when they are initially received, and migrate these files to the media library 130 at a later point. Computer instructions 155 may therefore be executable to store files stored by hosts using the network based file system to the computer readable memory 154. At some later point, the computer executable instructions 155 may be executable to migrate the file from the computer readable memory 154 to the media library 130. In this case, computer executable instructions 155 are executable to maintain mapping information between the files visible through the network based file system and the location of those files on the computer readable memory 154 or the media library 130.

The use of LTFS in conjunction with the media library 130 can afford a number of advantages when employed by an Archive Node Appliance 115 to implement a networked based file system. One important advantage is that the file system structure presented through the file system may be substantially mirrored on the tapes of the media library 130. Accordingly, if there is a failure of the Archive Node Appliance 115 or media library 130, the files on the tapes of the media library 130 may be easily located, as they are stored according to a structure that is substantially identical to that defined by the users at the hosts using the network based file system.

Furthermore, the use of LTFS means that tapes on which files of the network based file system are stored may be mounted and the file system on these tapes accessed, using any computing device which supports LTFS. As LTFS is commonly provided in many of today's operating systems, these tapes (and files stored thereon) may be easily accessed, allowing files to be restored or otherwise manipulated without requiring specialized software.

To put a finer point on some of the advantages offered by embodiments disclosed herein, the functionality and performance of a network based file system may be achieved while simultaneously achieving the benefits of storage on a medium typically used for backup without the need for any type of specific backup application. The use of an Archive Node Appliance may abstract the media library to implement a network based file system and hide the corresponding complexity entailed by the use of such a media library. By using a computer readable memory which is relatively faster for random accesses such as a disk in conjunction with the media library to provide the network based file system the Archive Node Appliance may provide the speed customarily associated with a network based file system by masking the latency of the use of the media library. Simultaneously, the use of such a media library provides the benefit of having files automatically stored on a storage media typically used for backup without specific action by users or the use of a backup application.

Furthermore, the use of LTFS in conjunction with the media library allows the file system created by users using the network based file system to be mirrored on the storage media. Thus, when restoring files from the storage media of the media library in the event of a failure, no specialized structural knowledge is required. The files on the storage media are in the locations where they were placed by the users in conjunction with the network based file system. Moreover, since LTFS is commonly supported data on the storage media may be easily accessed without the need for specialized software such as a backup application.

Figure 2:
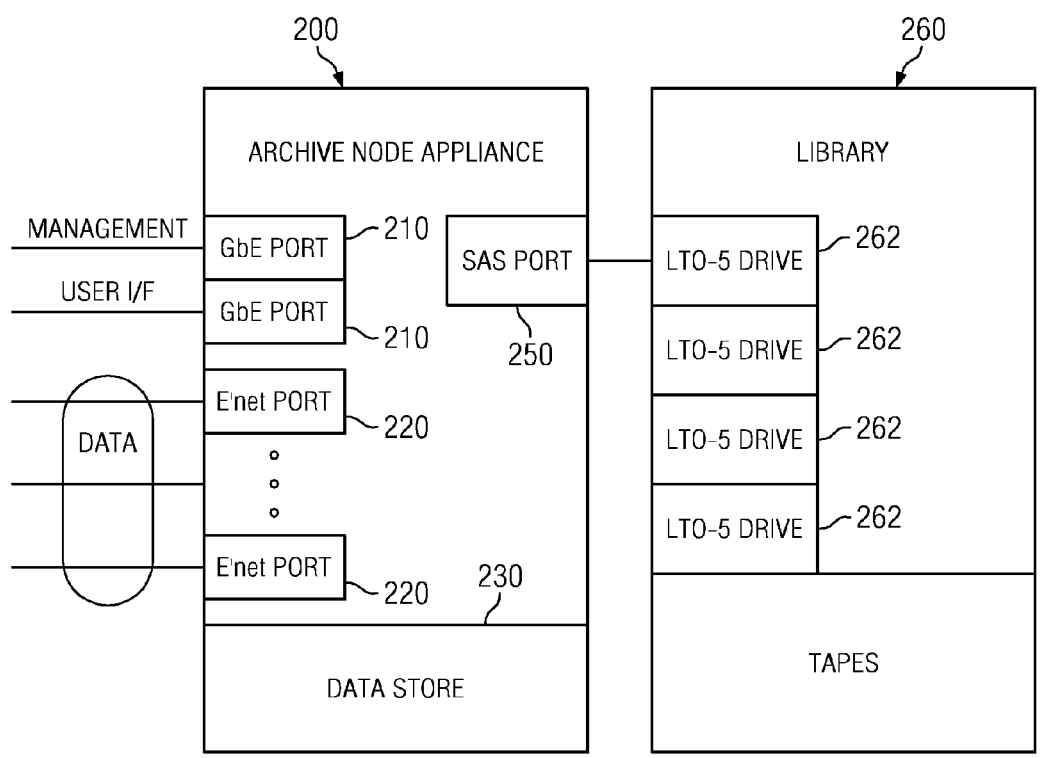
FIG. 2 is a diagrammatic representation of one embodiment of an Archive Node Appliance.

It may be helpful here to illustrate architectures for certain embodiments of an Archive Node. FIG. 2 depicts one embodiment of an architecture for an Archive Node that may be used in instances where relatively lower capacity is desired. Here, the Archive Node Appliance 200 may comprise one or more Gigabit Ethernet ports 210. These Gigabit Ethernet ports 210 may be dedicated to providing a user interface or for a systems management interface such as the Intelligent Management Platform Interface (IPMI). The Archive Node Appliance 200 may also comprise one or more Ethernet ports 220 for data connections. These Ethernet ports may be 10BASE-T, 100BASE-TX, 1000BASE-T, 10GBASE-LR, 10GBASE-LW, 10GBASE-LRM, 10GBASE-ZR, 10GBASE-LX4, 10BASE-CX4, etc. or may be of a mixture of types. In operation these Ethernet ports 220 may be coupled to hosts, such that a network based file system may be provided by the Archive Node Appliance 200 and hosts may interface with the Archive Node Appliance 200 using these Ethernet ports 220 to utilize the network based file system, for example, by storing or retrieving files using the network based file system. The network based file system may be implemented using a file system implemented in association with user space such as the File system in User space (FUSE) file system; using a kernel-based file system such as Ext2, Ext3, Ext4 Next3, etc.; or almost any other type of file system desired.

Archive Node Appliance 200 also includes a data store 230. Data store 230 may be a computer readable memory used to store computer executable instruction, files stored using the network based file system or other data utilized by Archive Node Appliance 200, as will be elaborated on in more detail subsequently. To ensure some degree of redundancy or fault tolerance, data store 230 may implemented as Redundant Array of Independent Disks (RAID) storage having around 5 TB-8 TB of available storage. Archive Node Appliance 200 also comprises a SAS port 250 through which the Archive Node Appliance 200 is coupled to media library 260 via a SAS bus. Media library 260 may be an IBM TS3100 tape library having one or more LTO-5 compliant drives 262 and capable of holding 24 tape cartridges or an IBM TS3200 tape library having one or more LTO-5 compliant drives 262 capable of holding 48 tape cartridges. In other embodiments, the media library may include LTO-6 compliant drives or other types of drives.

While it should be noted that Archive Node Appliance 200 may be implemented in substantially in any form factor desired, in one embodiment Archive Node Appliance may be based on a rack-mount storage format and may, for example, be contained in a chassis of a 1U, 2U or 3U form factor with the data store residing internally to the chassis.

Figure 3:
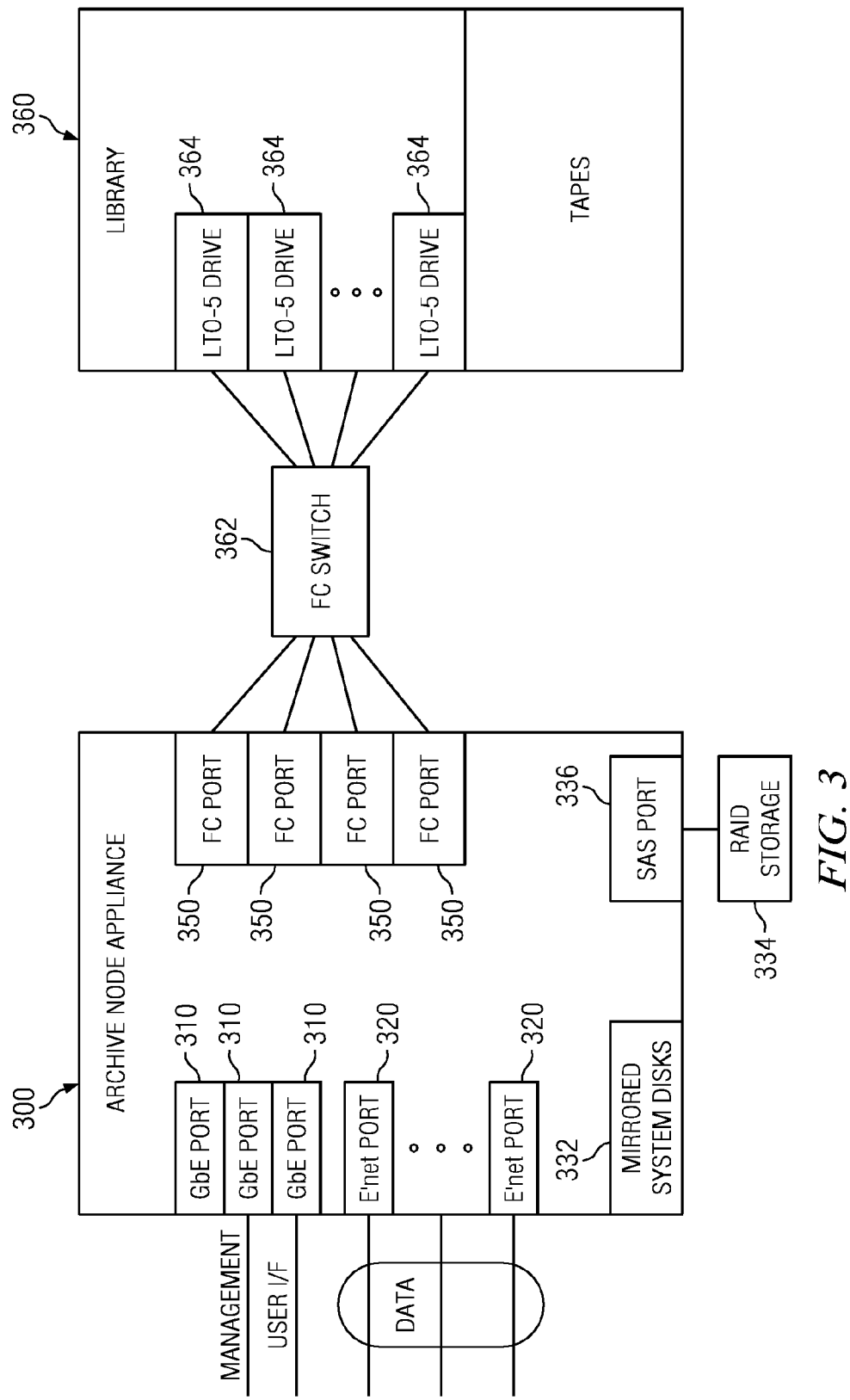
FIG. 3 is a diagrammatic representation of one embodiment of an Archive Node Appliance.

Moving on, FIG. 3 depicts one embodiment of an architecture for an Archive Node that may be used in instances where relatively greater storage capacity is required, such as in, for example, large data installations or a cloud storage provider. In this embodiment, the Archive Node Appliance 300 may comprise one or more Gigabit Ethernet ports 310. These Gigabit Ethernet ports 310 may be dedicated to providing a user interface or for a systems management interface. The Archive Node Appliance 300 may also comprise one or more Ethernet ports 320 for data connections. These Ethernet ports may be 10BASE-T, 100BASE-TX, 1000BASE-T, 10GBASE-LR, 10GBASE-LW, 10GBASE-LRM, 10GBASE-ZR, 10GBASE-LX4, 10BASE-CX4, etc. or may be of a mixture of types. In operation these Ethernet ports 320 may be coupled to hosts, such that a network based file system may be provided by the Archive Node Appliance 300 and hosts may interface with the Archive Node Appliance 300 using these Ethernet ports 320 to utilize the network based file system, for example, by storing or retrieving files using the network based file system. As noted above, the network based file system may be implemented using a file system implemented in association with user space such as the File system in User space (FUSE) file system; using a kernel-based file system such as Ext2, Ext3, Ext4 Next3, etc.; or almost any other type of file system desired. Archive Node Appliance 300 also includes a data store 334.

Data store 334 may be a computer readable memory used to store computer executable instructions, files stored using the network based file system or other data utilized by Archive Node Appliance 300. To ensure redundancy or fault tolerance, data store may comprise a mirrored system disk 332 comprising the computer executable instruction and other data utilized by the Archive Node Appliance 300 during operation and Redundant Array of Independent Disks (RAID) storage 334 coupled to the Archive Node Appliance 300 through SAS port 336. The RAID storage may be used to store files associated with the network based file system and may have around 9 TB-150 TB of available storage. Archive Node Appliance 300 also comprises fibre channel ports 350 through which the Archive Node Appliance 300 is coupled to media library 360 via a fibre channel switch 362. These fibre channel ports 350 may be, for example, 16, 8, 4 or 2 GB fibre channel ports. Media library 360 may be an IBM TS3500 tape library having one or more LTO-5 compliant drives 364 and capable of holding around 20,000 tapes, a media library having one or more LTO-6 compliant drives or a media library supporting other types of tapes that can be formatted according to a tape file system.

Again, while it should be noted that Archive Node Appliance 300 may be implemented in substantially in any form factor desired, in one embodiment Archive Node Appliance 300 may be based on a rack-mount storage format and may for example, be contained in a chassis of a 1U, 2U or 3U form factor with the data store residing internally to the chassis or portions of the data store, such as the RAID storage residing external to the chassis.

Figure 4:
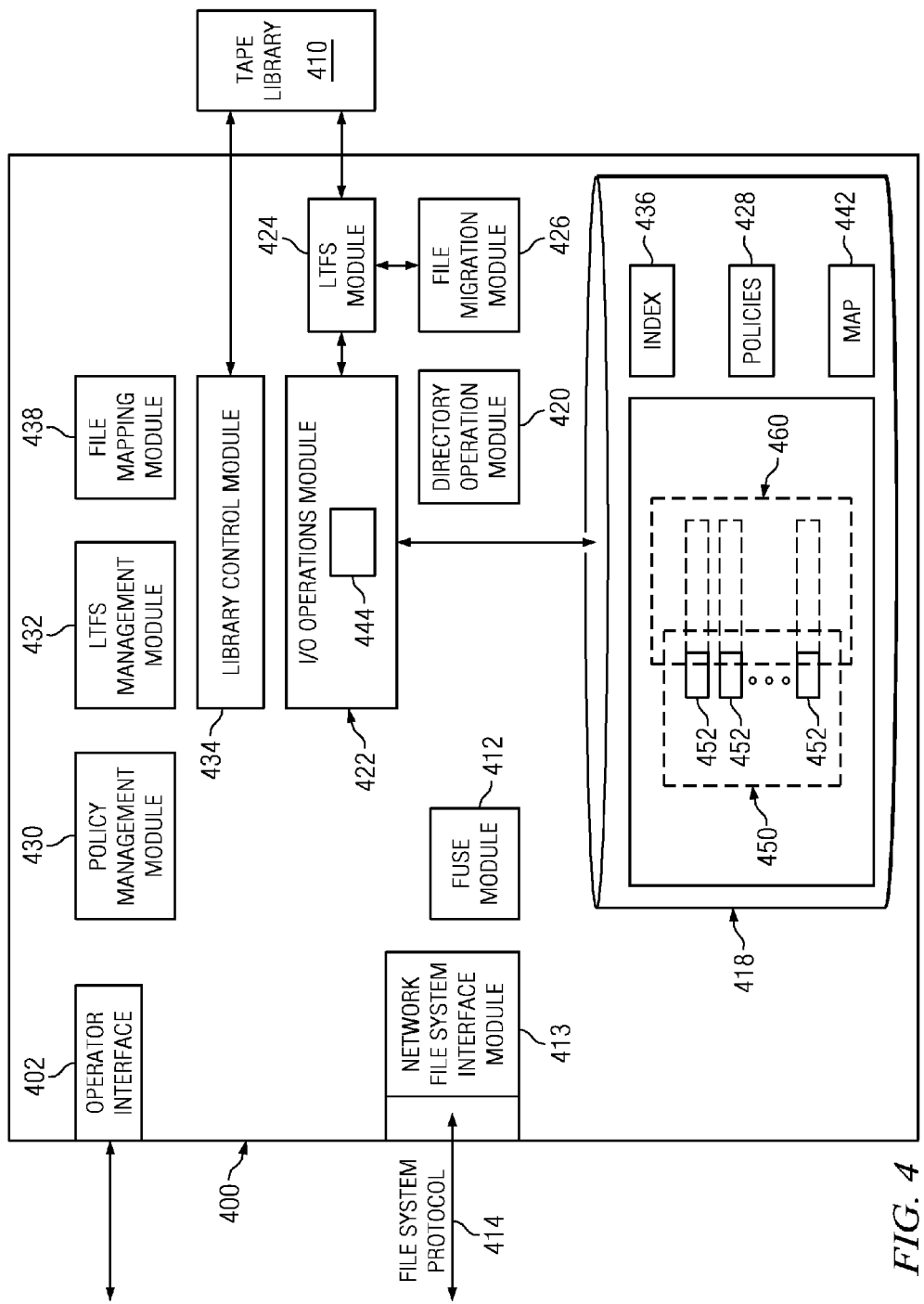
FIG. 4 is a diagrammatic representation of one embodiment of an Archive Node Appliance.

Turning now to FIG. 4, one embodiment of a functional architecture for an Archive Node is depicted. Archive Node Appliance 400 may provide an operator interface 402 through which the Archive Node Appliance 400 may be configured. Such an operator interface 402 may be provided, for example, using a network based interface such as a set of web pages or the like. Archive Node Appliance 400 is coupled to tape library 410, comprising a set of LTO-5, LTO-6 or other tape compliant drives some of which may be LTFS (or other tape file system) formatted tapes. In one embodiment, each tape in tape library 410 may be used to store data that is compressed, data that is encrypted, data that is both compressed and encrypted or data that is neither compressed nor encrypted.

Archive Node Appliance 400 comprises Filesystem in Userspace (FUSE) module 412 that may presents a file system to a local operating system. A network file system interface module 413 provides access to all or a portion of the FUSE file system as one or more shared volumes (e.g., as a hierarchical file system with directories, etc.) that can be accessed using an interface that operates according to network file system protocol 414 such as NFS, CIFS, FTP, REST etc. Data associated with the shared volumes is stored on one or more partitions of data store 418 (a computer readable memory), where the structure of the partitions of the data store 418 may, or may not, correspond to the structure of the shared volumes or to the structure of the file system presented by FUSE module 412.

Directory operations module 420 is configured to process any directory operations that are received by FUSE module 412. I/O operations module 422 is configured to process any input or output operations involved with the reading or the storing of files associated with the file system presented by the FUSE module 412. These operations include, for example, the writing of files to the data store 418, the reading of files from the data store 418, the deletion of files from the data store 418, the reading of files from a tape in the tape library 410 or other operations associated with the data store 418 or tape library 410.

These I/O operations may involve the use of library control module 434, LTFS module 424, LTFS management module 432 and index 436. The location of each tape within the tape library 410 may be maintained in index 436 (e.g. in which slot or drive each tape is located, in which library the tape is located if multiple tape libraries are in use, etc.). Additionally, in one embodiment, what type of data is stored on each tape (encrypted, compressed, neither encrypted nor compressed, etc.) may also be maintained.

Library control module 434 is configured to control the movement of the tapes in the tape library 410, including ejecting the tapes from the drives of the tape library 410, and the movement of tapes to and from slots of the tape library 410 and in and out of drives of the tape library using the robot. LTFS management module 432 is configured to mount or unmount the LTFS file system on a particular tape in a drive of the tape library 410. LTFS module 424 is configured to perform LTFS operations with respect to an LTFS mounted file system.

Library control module 434, LTFS module 424, LTFS management module 432 and index 436 may also be utilized by file migration module 426. File migration module 426 is configured to move files from data store 418 to tape library 410 based on policies 428. File mapping module 438 maintains map 442 which correlates a file visible through the FUSE file system to its corresponding location in the tape library 410. Specifically, a mapping between the location (for example the path) and name of the file with respect to the FUSE file system, the name and location of that file in the data store 418 and the name and location of that file on one or more tapes in the tape library 410 may be maintained in map 442.

Policies 428 may, or may not be, user configured and may be associated with storage of the files or the migration of files from the data store 418 to tapes in the tape library 410. Such policies may specify, for example, how long to wait before migrating a file (referred to herein as a migration timeout period), whether the files are to be replicated when migrated (e.g. stored in conjunction with multiple Archive Nodes as will be elaborated on in more detail), how many copies of the file to keep, where the multiple copies are to be kept on different tapes, whether the file is to be encrypted or compressed, etc. The policies 428 may be defined with respect to the directories presented with respect to the FUSE module 412 such that those policies may be defined with respect to all files within that directory. Policy management module 430 allows these policies to be managed (e.g., created, updated, defined, deleted, modified, etc.) by a user or otherwise. Policies can be defined at any level of the directory structure provided by FUSE module 412. Because a directory presented by FUSE module 412 may be presented as a shared volume by network file system interface module 413, a policy that applies to the directory may also apply to the share.

In operation then, Archive Node Appliance 400 may present a network based file system accessible through an interface, where the files associated with the network based file system may be stored on the tape library 410 according to a file system structure that substantially mirrors the file system structure of the presented network based file system. In one embodiment, mirroring the file system structure of the presented network based file system means that at least a portion of the path of the location of the file as it is stored on the tape library 410 may be substantially similar to the path of the location of the file as it is presented through the file system.

More specifically, users at host devices coupled to the Archive Node Appliance 400 may perform directory operations and store or read files using an interface for the network based file system provided by the Archive Node Appliance 400. In accordance with these user initiated operations, commands in the network file system protocol 414 employed by the interface may be received at the Archive Node Appliance 400 and implemented by FUSE module 412 with respect to the partitions of data store 418. If the command is associated with a directory operation it may be processed by directory operations module 420. If the command is for the storing of a file, the I/O operations module 422 may write this file to a location in the data store 418. Map 442 may be updated to comprise a mapping between the location and name of the file with respect to the FUSE file system and the name and location of that file in the data store 418.

In one embodiment, the file is stored in the data store 418 according to the one or more policies that apply to that file. For example, if a policy that applies to the file specifies that the file should be compressed the file may be compressed before the file is stored in the data store 418. Similarly, if an applicable policy specifies that the file is to be encrypted the file may be encrypted before it is stored in the data store 418. In certain embodiments, a self-encrypting disk, full disk encryption or a RAID controller which performs encryption may be utilized in conjunction with data store 418, such that all files stored in the data store 418 may be encrypted by the disk or controller when the file is stored to the data store 418. In such cases, all files stored to the data store 418 may be encrypted when stored to data store 418 and decrypted when read from data store 418.

Based on one or more of the policies 428, at some later point a file may be migrated to the tape library 410. As policies 428 may be defined based on a location associated with the presented file system, policies associated with the location (e.g. directory, share, etc.) where the file is stored may be determined from policies 428 and the determined policies applied to migrate the file.

As the file may be received over a network, errors may occur during the transmission of the file or the storage of the file to the data store. To account for network errors or the like, in one embodiment, a time period referred to as the migration timeout period is utilized. More specifically, when a file is first stored to the data store an amount of time equal to the migration timeout period may be allowed to elapse before the file is migrated. As discussed above, such a migration timeout period may be implemented as a policy. Thus, for example, a policy defining such a migration timeout period may be associated with a share or directory as visible through the network based file system implemented by the Archive Node Appliance.

In any event, once a file is selected for migration, the one or more policies 428 associated with that file may be utilized to migrate the file accordingly (e.g., encrypted, compressed, neither encrypted nor compressed, whether multiple copies of the file are to be maintained, if the file is to be replicated, etc.).

An appropriate tape on which to store the file may be determined and located using the index 436. If the appropriate tape is not currently in a drive of the tape library, library control module 434 may be utilized to load the appropriate tape into a drive of the tape library 410. More specifically, in most cases when an LTFS tape is formatted it is specified whether the data on that tape is to be compressed or not. Thus, the selection of an appropriate tape may include selecting a tape that is formatted according to a policy specified for the file being migrated (e.g., a tape formatted to hold compressed data may be selected if a policy specifies the file is to be compressed, etc.), selecting a tape that has a location associated with a location where the file is to be stored (e.g., a directory in the path of the location where the file is to be stored, etc.), etc. The selection of an appropriate tape may also involve other considerations not expressly enumerated.

The file system on the appropriate tape may be mounted using LTFS management module 432. File migration module 426 may use LTFS module 424 to copy the file from data store 418 to the appropriate tape at a location on the tape which corresponds to the location of the file as presented through the file system to the host devices coupled to the Archive Node Appliance. After the file is copied to the tape, all, or a portion of, the file may be deleted off of the data store. Accordingly, the migration may entail the creation of one or more directories on the mounted LTFS file system on the tape, where these directories may mirror the directories in the path where the file is stored that are visible to a user at a host device using the network based file system presented by the Archive Node Appliance 400. Additionally, when the file is copied to the mounted LTFS file system on the appropriate tape, actions may be taken to implement policies applicable to the file.

For example, if a policy that applies to the file specifies that the file should be compressed, the media drive can be instructed to compress the file. In one embodiment, the use of LTFS may simplify this compression. Specifically, if a file is to be compressed the selection of an appropriate tape formatted to store compressed data may indicate to the LTFS module 424 that data to be stored on the tape is to be compressed. The LTFS module 424 may configure the drive holding that tape to compress data such that when the file is stored to the tape using LTFS module 424 it is compressed as it is stored.

Similarly, if an applicable policy specifies that the file is to be encrypted, the drive can be instructed to encrypt the file. Encryption of the file being stored may be accomplished by the tape drive in which the appropriate tape is located. Specifically, before mounting the LTFS file system on the appropriate tape one or more commands (for example, SCSI or other types of commands that may or may not include key information to be utilized) may be sent to the drive to cause it to use encryption. The LTFS file system can then be mounted on the tape. LTFS can then be used to store the file on the tape while the tape drive handles the encryption of the data transparently to LTFS.

Other embodiments may accomplish compression or encryption of the files in different manners. For example, in one embodiment, to speed the migration of files, Archive Node Appliance may provide hardware support for such encryption or compression. Embodiments of methods and systems for such encryption or compression are discussed in U.S. patent application Ser. No. 12/025,081, entitled "System and Method For Enabling Encryption", by Robert C. Sims, filed on Feb. 4, 2008 which is hereby incorporated by reference for all purposes.

Additionally, if a policy 428 associated with the file specifies that multiple copies of a file are to be maintained a second tape on which to store the file may be determined and the file migration module 426 may use LTFS module 424 to copy the file from data store 418 to the second tape at a location on the second tape which corresponds to the location of the file as presented through the FUSE file system. Notice here that two separate tapes may have the file stored using an LTFS file system path that mirrors the path of that file as presented through the FUSE file system. Furthermore, if a policy associated with the file specifies that the file is to be replicated the file may also be sent to another Archive Node Appliance, as will be discussed in more detail.

In addition to storing files on the tape, the archive node appliance may store file system metadata of the FUSE file system (or other file system) on the tape in addition to the metadata stored according to the LTFS file system. The metadata stored may include information necessary for the FUSE file system of another archive node appliance to present files from the tape in a similar manner as the FUSE file system of the originating archive node appliance, including associating the file with the same users, policies, etc.

When a command to read a file is received, map 442 may be consulted to determine the location of the file (e.g., whether it is located in data store 418, on a tape in the tape library 410 or both). If the requested file is completely on the data store 418, I/O operations module 432 may respond to the read of the file using the file as stored in the data store 418. If the file is on a tape (and not entirely in the data store 418), the tape on which the file is located may be determined using the map 442. The index 436 and the library control module 434 can then be utilized to determine if the tape is in a drive, and if not, to load the appropriate tape into a drive of the tape library 410. The file system on the tape may be mounted using LTFS management module 432. I/O operations module 422 can then use LTFS module 424 to access the file on the tape and respond to the read of the file.

It will be noted here that certain actions may be taken in association with the read file before the file is used to respond to the read. In particular, in certain embodiments, actions associated with one or more policies applicable to the file may be performed. For example, if a policy that applies to the file specifies that the file should be compressed, the file may be decompressed as the file is read from the tape and before the file is used to respond to the read of the file. In one embodiment, the use of LTFS may simplify this decompression. Specifically, the tape on which the file is stored may be formatted to store compressed data. The presence of this type of tape in the drive may indicate to the LTFS module 424 that data stored on the tape is compressed. The LTFS module 424 may thus configure the drive holding that tape such that when the file is read from the tape using LTFS module 424 it is decompressed.

Similarly, if an applicable policy specifies that the file is to be encrypted the file may be decrypted before the file is used to respond to the read of the file. As LTFS may not support encryption, in one embodiment, decryption of the file being stored may be accomplished by the tape drive in which the appropriate tape is located. Specifically, before mounting the LTFS file system on the tape on which the file is stored one or more commands (for example, SCSI or other types of commands that may or may not include key information to be utilized) may be sent to the drive to cause it to decrypt the file. The LTFS file system can then be mounted on the tape. LTFS can then be used to read the file while the tape drive handles the decryption of the data transparently to LTFS. The file is then used to respond to the read of the file.

If the file is located on the tape and the FUSE file system does not contain metadata for the file, the FUSE file system metadata stored on the tape can be read and stored. Consequently, if files on the tape were originally stored by a first archive node appliance and the tape read by a second archive node appliance, the file system of the second archive node appliance will have the information necessary to describe the files, including information not typically maintained or used by the LTFS file system of the tape.

In many cases, however, if the file is located on tape, it may take a relatively long amount of time to access the file. This situation may be exacerbated if, for example the file system on the tape is not currently mounted, the tape itself is not currently in a drive of the tape library, the tape is currently positioned at a location far away from the location where the file is located, etc. These conditions can result in an access time for a file on tape that is on the order of minutes.

Many network based file system protocols have timeout conditions. For example, in the CIFS protocol, an OPEN or a READ command must be responded to within 30 seconds or a timeout condition will occur. The timeout condition may be dependent on the type of network file systems used. In some cases, the timeout period is negotiated between a host and file system. Thus, the Archive Node Appliance 400 can be configured to negotiate the timeout time with hosts. The timeout time can be set in a configuration setting for Archive Node Appliance 400. As a result, the time period for responding to such a command may be less than that needed to access the file on the tape. In order to present network based file systems based on these types of protocols such conditions may need to be addressed.

To that end, in some embodiments, read cache 450 may be maintained on data store 418. Read cache 450 may comprise the first portion 452 of each file stored using the network based file system presented by the Archive Node Appliance 400. When a file is read, then, if any portion of the file is to be read from tape the first portion 452 of the read file that is stored in the read cache 450 may be used to respond to the read, while substantially simultaneously accessing the file on the tape. Since the first portion 452 of the file is stored in the read cache 450 on the data store 418 it can be accessed quickly enough that a timeout on commands can be avoided while the file on the tape is accessed. The remainder of the file can then be read from the tape and used to respond to the commands. The size of the first portion 452 of each file may be user configurable, based on system parameters, or defined in some other manner.

It will be noted that the read cache 450 may comprise first portions 452 of none, all, or some subset of, the files that are stored in conjunction with the network based file system. For example, if data store 418 is corrupted or otherwise unusable, when the data store 418 is replaced read cache 450 may comprise first portions 452 of none of the files. The read cache 450 may then be repopulated as files are accessed by users through the network based file system. During this repopulation then, read cache 450 may comprise first portions 452 of some subset of the files that are stored in conjunction with the network based file system.

Accordingly, in some embodiments, when a file is read if any portion of the file is to be read from tape it can be determined if the first portion 452 of that file is in the read cache 450. If it is that first portion 452 may be used to respond to the read as detailed above. If, however, the first portion 452 of the read file is not in read cache 450, the file may be read from tape and used to respond to the read. Additionally, the file data read from tape may be used to repopulate the read cache 450 by storing the first portion 452 of the read in the read cache 450 at that time (embodiments of which will be discussed in more detail below).

In one embodiment, as a CIFS command may have a 30 second timeout period and an average or poor timing scenario for a tape access may be on the order of 4 minutes, the first portion 452 of each file stored in the read cache 450 may comprise the first 512K of each file. In one embodiment, the read cache size may be based on directories provided by the FUSE module 412 so that all the files within the directory are a particular size. If the directory is presented as a share, the policy thus applies to files within the share. In another embodiment, the size retained on read cache 450 may be dependent upon the size of blocks that may be read in a single operation via the network file system, the set time for a timeout and the time required to load, mount and position a tape with the requested file. It will be noted that the data in the read cache 450 may be stored in a manner corresponding to the format in which the file is stored on the tape. Thus, for example, if the file is compressed when it is migrated to tape the read cache 450 may comprise the first portion 452 of the file in compressed format, where this first portion equals approximately 512k of data when uncompressed.

Initially then, when a host device using a CIFS based file system provided by the Archive Node Appliance wishes to read a file it may send an OPEN command to the Archive Node Appliance 400. I/O operations module 422 may determine if the requested file is completely in the data store 418 using map 442. If so, I/O operations module 422 may respond to the read of the file using the file in the data store 418.

If however, the file is on a tape, the tape on which the file is located may be determined using the map 442. The I/O operations module 422 can then initiate the load and access of the file on the tape using the library control module 434 and the LTFS management module 432. I/O operations module 422 delays the response to the initial OPEN command for a time period less than the timeout associated with the received command. In some embodiments, this time period may be the longest time period that does not result in a timeout occurring (e.g., 20 seconds, 29 seconds in the case of CIFS commands, or another time period in the case of commands in other protocols, etc.).

The host device may subsequently send a READ command for a certain amount (e.g., 64K or a different amount) of the file to the Archive Node Appliance 400. I/O operations module 422 can delay the response to this READ command as long as possible without a timeout resulting (e.g., 20 second, 29 seconds, in the case of CIFS commands, or another time period below the 30 second timeout in the case of commands in other protocols). After the delay, the I/O operation module 422 will respond to the command with the data requested. The I/O operations module 422 may continue to delay responses to subsequent READ commands and utilize data from the read cache 450 to respond to the READ commands until data from the first portion 452 is exhausted or the LTFS file system on the appropriate tape is mounted and the file on the tape can be accessed using LTFS module. The I/O operations module may continue to delay responses and dynamically switch between delaying responses and not delaying responses as needed.

In addition to delaying responses, Archive Node Appliance 400 can return less data than requested by the host. For example, Archive Node Appliance 400 may return 1K instead of the requested 64K. Whether Archive Node Appliance 400 returns less data than the amount requested may depend on the network file system protocol, host operating system or other factors. Returning less data than requested provides the advantage that the read cache can be smaller.

I/O operation module 422 may then use LTFS module 424 to access the file on the tape and respond to subsequent READ commands for the file. More specifically, in one embodiment I/O operations module 422 may utilize LTFS module 424 to access the file on the appropriate tape and read the file from the tape into buffer 444. Subsequent READ commands for the file may be responded to using the data in the buffer 444.

Furthermore, in some embodiments, in addition to reading the file into buffer 444 the file may also be read into a file cache 460 on the data store. File cache 460 may be an area on data store utilized for temporary storage of files and may be managed according to almost any cache management technique desired. In certain cases if a host does not request data of the file at a particular rate (e.g., does not issue READ commands frequently enough, or the READ commands do not request a certain amount of data, etc.), after a certain number of READ commands I/O operations module 422 may respond to subsequent READ commands for the file using data of the file from the file cache.

In certain embodiments the opposite may also occur. More specifically, in some instances the reading of file data to the file cache 460 in addition to reading the file into buffer 444 may slow the response to requests for data from the host. In this case, reading the file data into both buffer 444 and file cache may mean that data cannot be delivered at the rate the user is requesting the data or may otherwise slow the response to user requests. Here, the reading of the data of the file into the file cache 460 may be stopped before the entire file is in the file cache such that requests for the file may be serviced more quickly. Thus, the portion of the file that is in file cache 460 may comprise none, some, or all, of a file.

In one embodiment, the file may be stored in the file cache 460 by appending any portions of the file which are read from the tape to the first portion 452 of the file in the read cache 450 if such a first portion of the read file exists in read cache 450. Thus, if the first portion 452 exists in the read cache 450 when any portion of the file not comprised by first portion 452 in the read cache is read from the tape it may be appended to the first portion 452 already stored in the read cache 450. In either case (the first portion 452 does, or does not, exist in the file cache) the entire file may be stored in the file cache 460 when the file is read. Thus, at a later point, if portions of the file are deleted from the file cache 460 the first portion 452 of the file may be left on the data store 418 such that the first portion 452 of the file is in read cache 450. Accordingly, the read cache 450 will be repopulated with the first portion of that file if the first portion 452 was not in the read cache 450 before the file was read.

It may be useful to discuss embodiments of the storage of mapping data, index data, policies, file meta-data, tape-library data, etc. that may be utilized by an Archive Node Appliance. Embodiments of such storage methods and formats may be used, for example, to store the map, index and policies as discussed above. FIGS. 5A-5D depict one embodiment of a schema for a database that may be utilized in conjunction with embodiment of an Archive Node.

Figures 3, 5A:
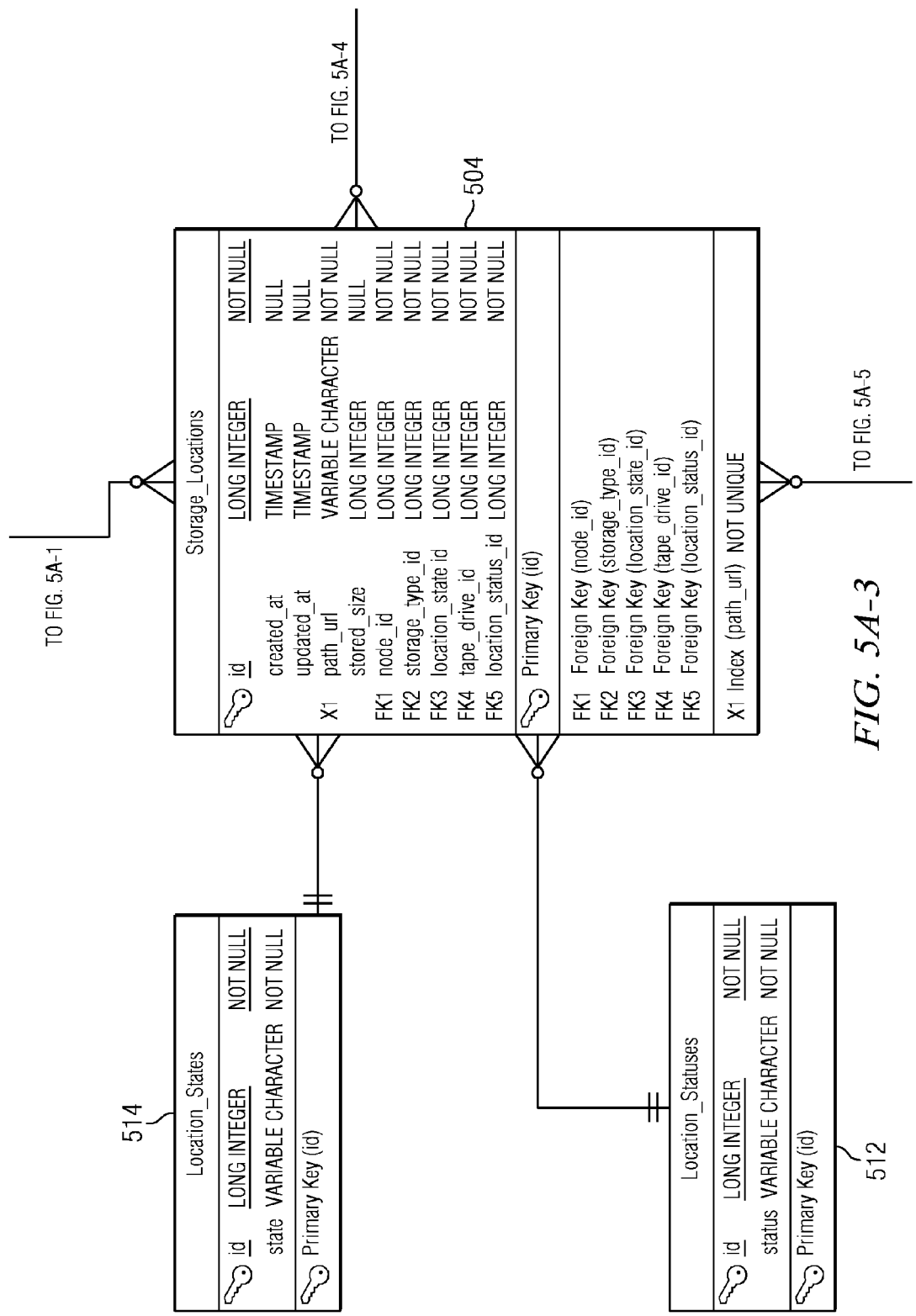
FIGS. 5A-5D are diagrammatic representations of one embodiment of a schema.
Figures 4, 5A:
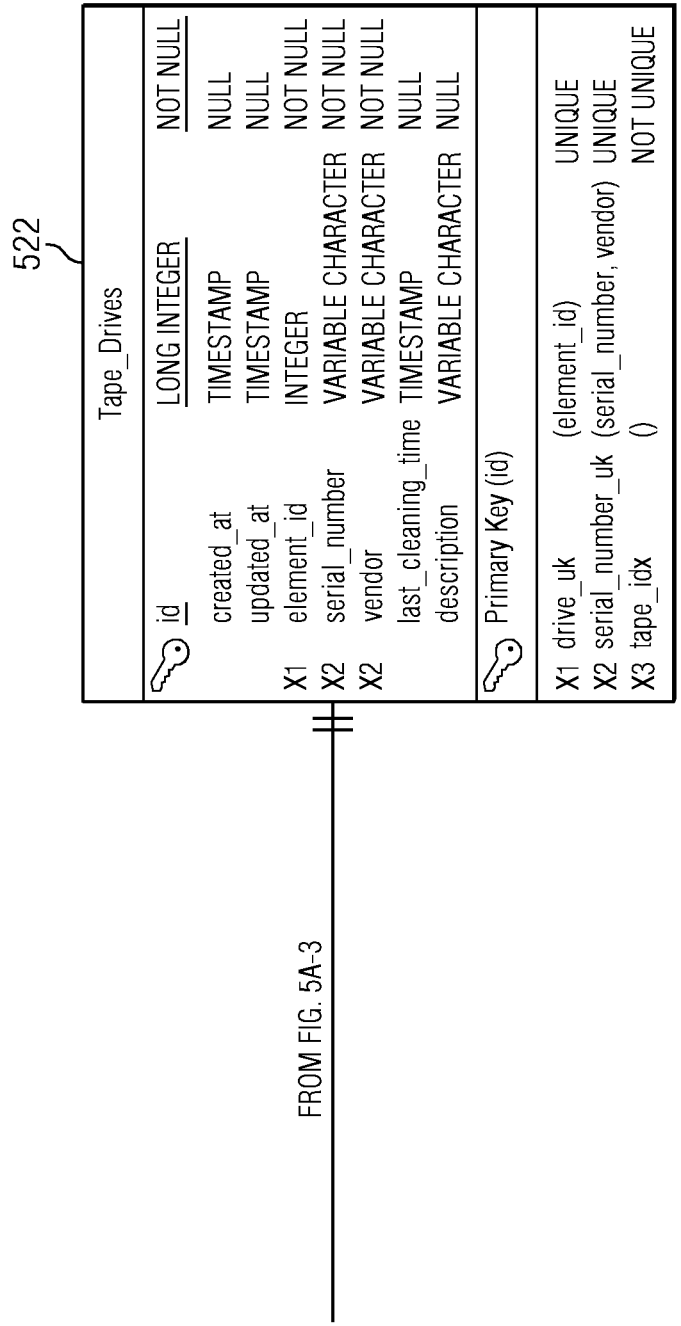

Turning first to FIG. 5A, one embodiment of a table schema for the storage of data relating to files and directories is depicted. In this schema, there is a node table 502, a storage location table 504, a storage media table 506, a disk table 508, a storage type table 510, a location statuses table 512, a Disk to Tape File System (used to refer to embodiments of an implementation of a file system using an Archive Node, also known by the acronym DTFS) settings table 516, DTFS users table 518, DTFS groups table 520, tape drives table 522, tapes table 524 and storage method types table 526.

Storage locations table 504 may comprise information on locations where data can be stored in conjunction with an Archive Node and thus entries in the storage location table 504 may be linked to entries in the storage media table 506. Entries in storage media may, in turn, be linked to entries in the disk table 508 that are associated with a data store of the Archive Node and entries in tapes table 524 that are associated with tapes in the tape library of the Archive Node. Entries in storage locations table 504 may also be linked to entries in tape drives table 522 that are associated with drives in the tape library of the Archive Node. Entries in the storage location table 504 may also be associated with a state and a status as represented by entries in the location states table 514 or the location statuses table 512.

Nodes table 502 comprises entries which are associated with a file or a directory as presented by the FUSE file system. In general the top level directory used by a FUSE file system of an archive node appliance can be a universally unique identifier (UUID) associated with the archive node appliance. Examples of such an identifier include, but are not limited to, a serial number, a software license number or other unique identifier. The use of a UUID as the top level directory by archive node appliances ensures that path names to files stored by that archive node appliance will not conflict with the path names used at a second archive node appliance if the tape if transferred to the second archive node appliance.

Entries in the node table 502 are linked with entries in the DTFS users table 518 where these entries may represent users of the DTFS file system (which may be defined by an administrator, based on the network based file system implemented by the Archive Node, etc.). Each of the entries in node table 502 may also be linked with entries in the storage location table 504 such that a link between an entry in the node table 502 associated with a file or directory may be linked with one or more entries in the storage location table 504 associated with a disk or tape where that file or directory is stored.

In the case in which an archive node appliance is part of a Windows Active Directory domain, active directory does not use Unix-like user IDS and group IDs to identify users. Active directory uses strings referred to as security identifiers (SID) for this purpose. Accordingly, the DTFS user table 518 and DTFS groups table 520 may include an entry for a user group SID that links the SID to the DTFS user id and, if applicable, to the appropriate Unix user ID (UID) and group ID (GID).

Figures 5, 5A:
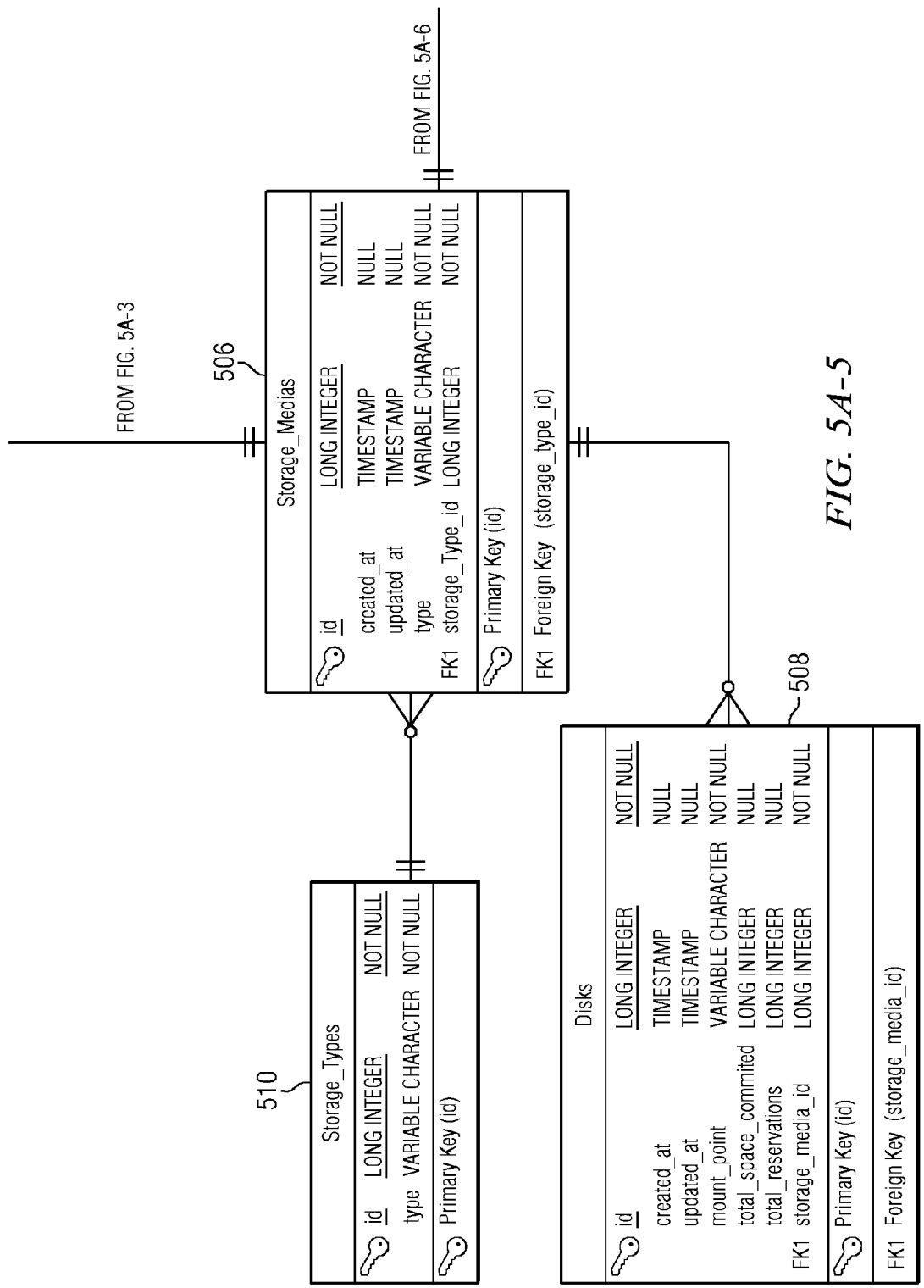
Figures 1, 5B:
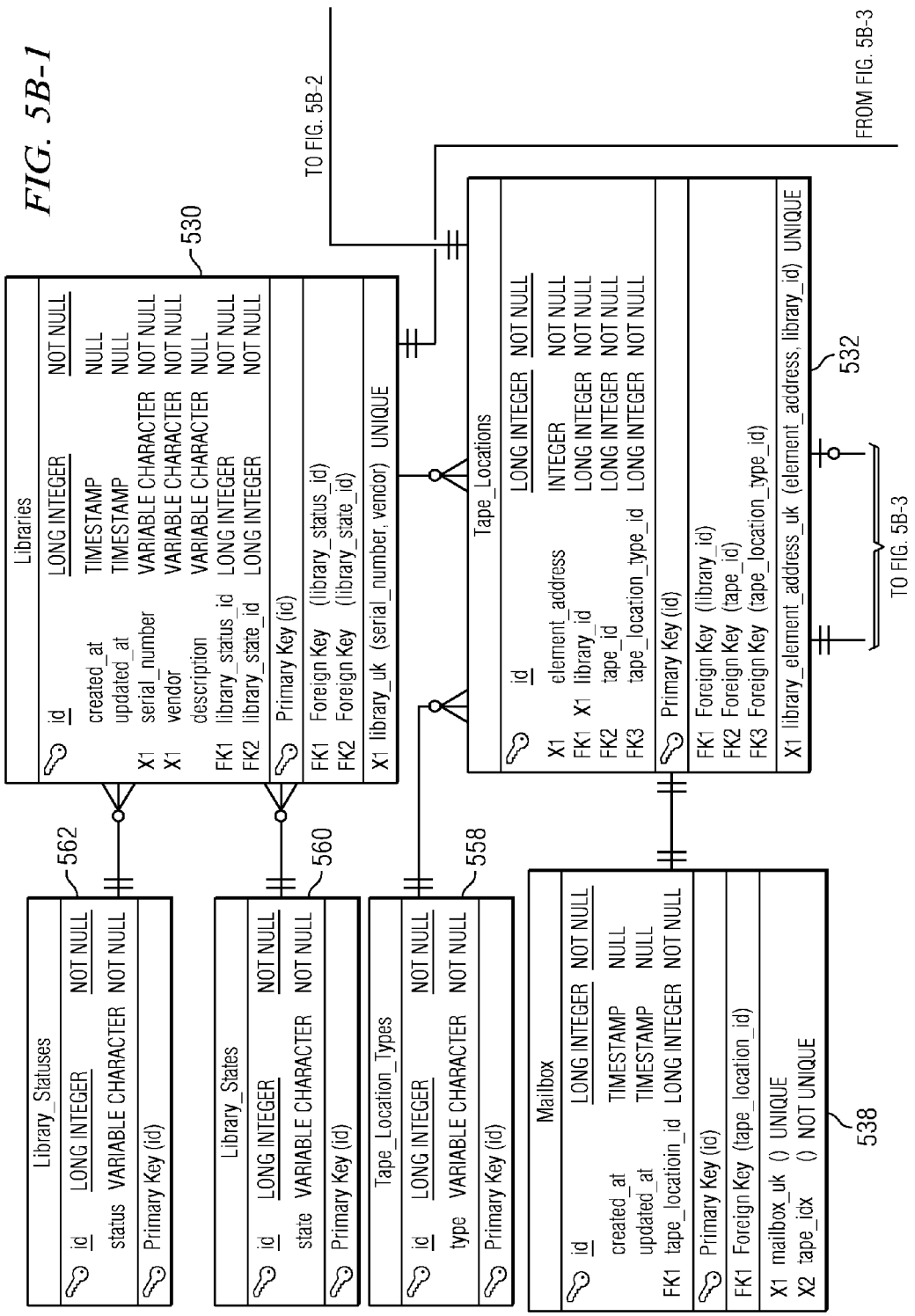
Figures 2, 5B:
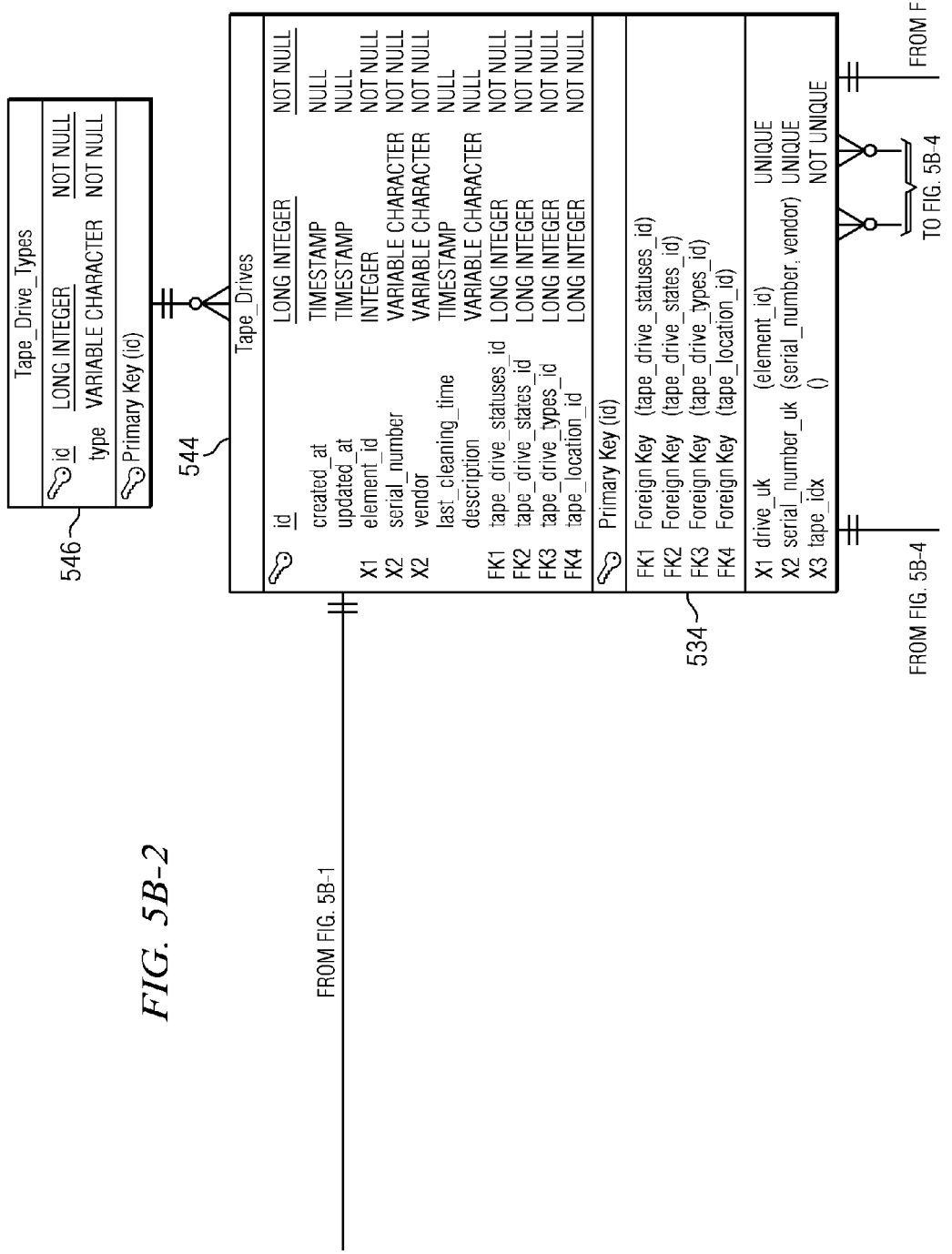
Figures 3, 5B:
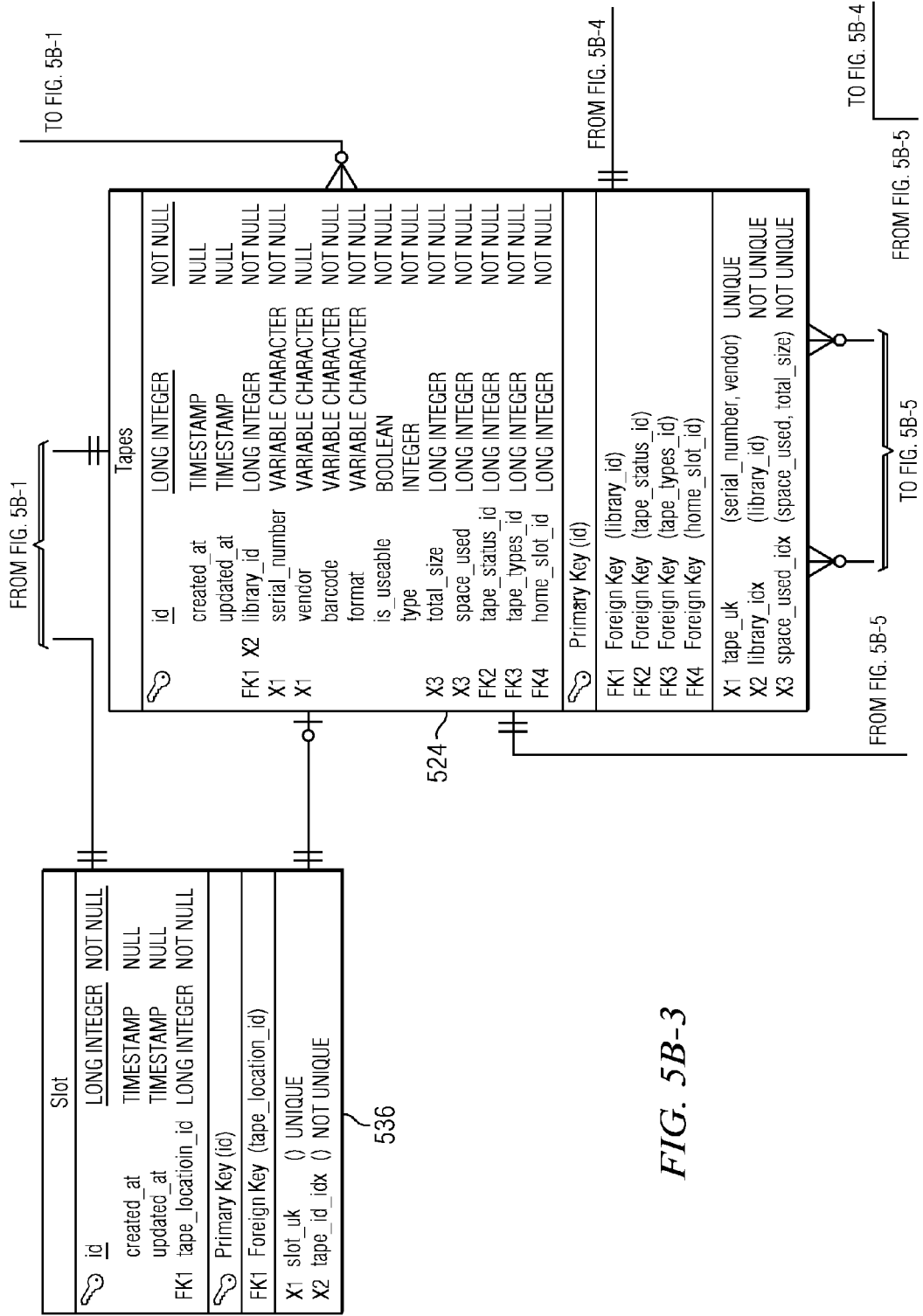
Figures 4, 5B:
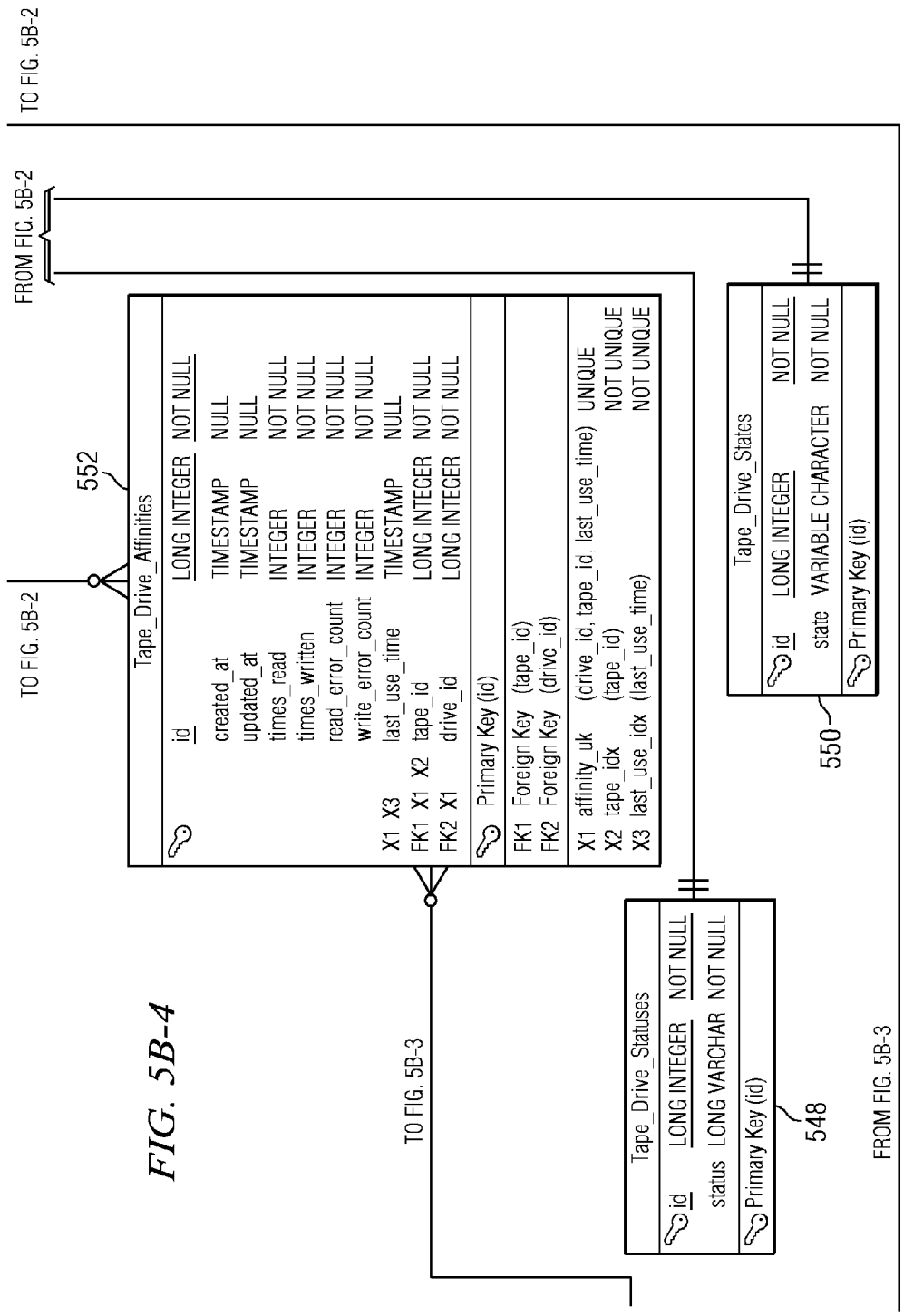
Figures 5, 5B:
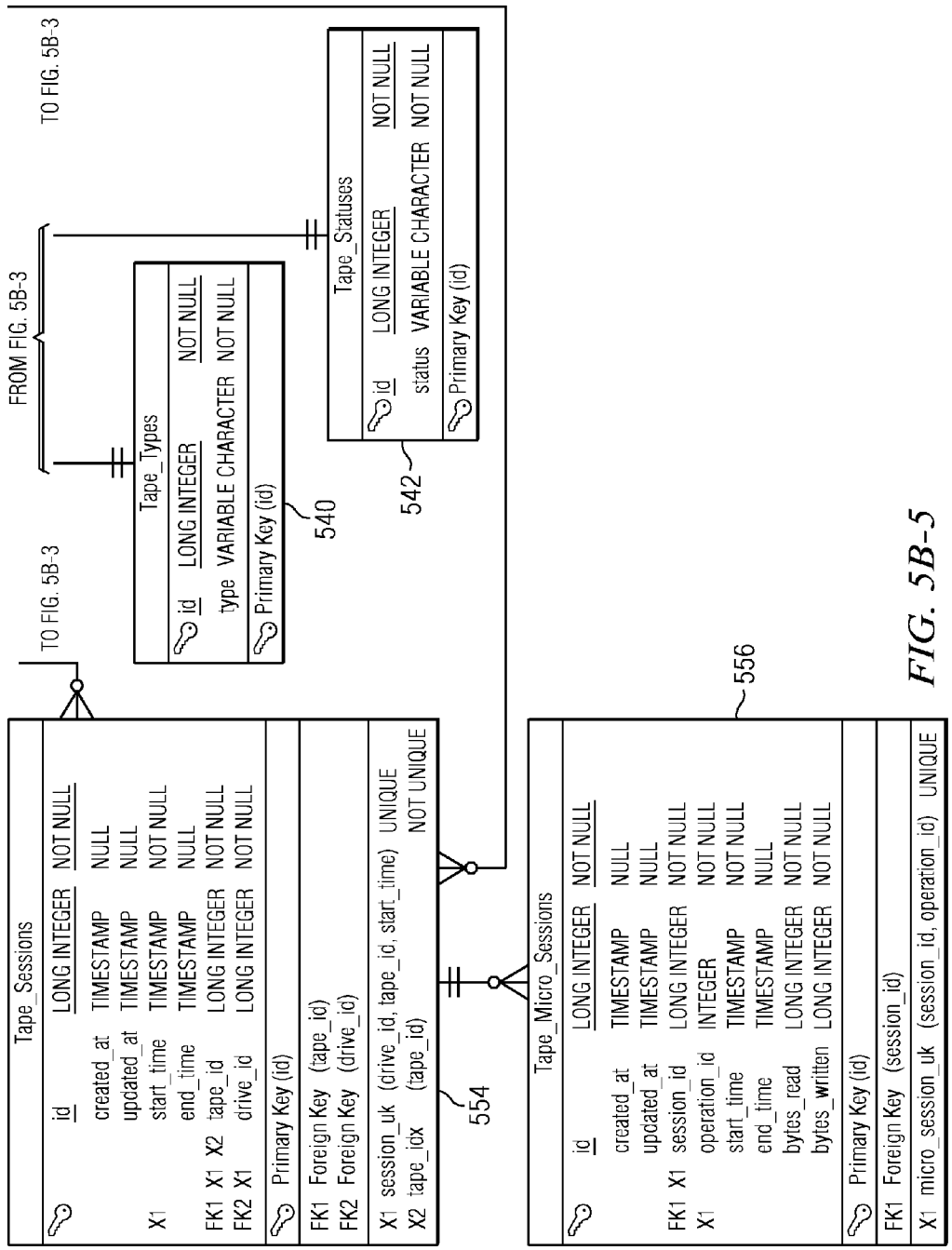

Moving now to FIG. 5B one embodiment of a table schema for the storage of data relating to tapes and tape libraries of an Archive Node is depicted. In this schema, there is a tapes table 524, tape locations table 532, libraries table 530, tape statuses table 542, tape types table 540, library statuses table 562, library states table 560, tape location types table 558, mailbox table 538, slot table 536, tape sessions table 554, tape micro sessions table 556, tape drive types table 546, tape drives table 534, tape drive affinities table 552, tape drive statues table 548 and tape drive states table 550.

Entries in tapes table 524 may be associated with an entry in tape locations table 532 associated with a location of tape in a tape library (for example, a slot, drive, etc.). Each of the entries in tape location table 532 may be associated with an entry in slot table 536 associated with a slot in a tape library or an entry in tape drives table 544 associated with a drive in the tape library. Furthermore, entries in tape locations table 532 and tapes table 524 are linked with an entry in libraries table 530 associated with a tape library of the Archive Node (of which there may be one or more, as discussed above). In this manner, an entry in tapes table 524 associated with a tape can be associated with an entry in library table 530, slot table 536 or tape drive table 544 associated with the location of that tape.

Entries in tape drive table 544 may be also linked to an entry in tape drive types table 546 associated with a type of the drive, or an entry in tape drive statuses table 548 or tape drive states table 550 associated with a statuses or state of a tape drive. Entries in tapes table 524 may also be linked to entries in tape status table 542 and tape types table 540 associated with a type or a status of a tape.

Figures 2, 5C:
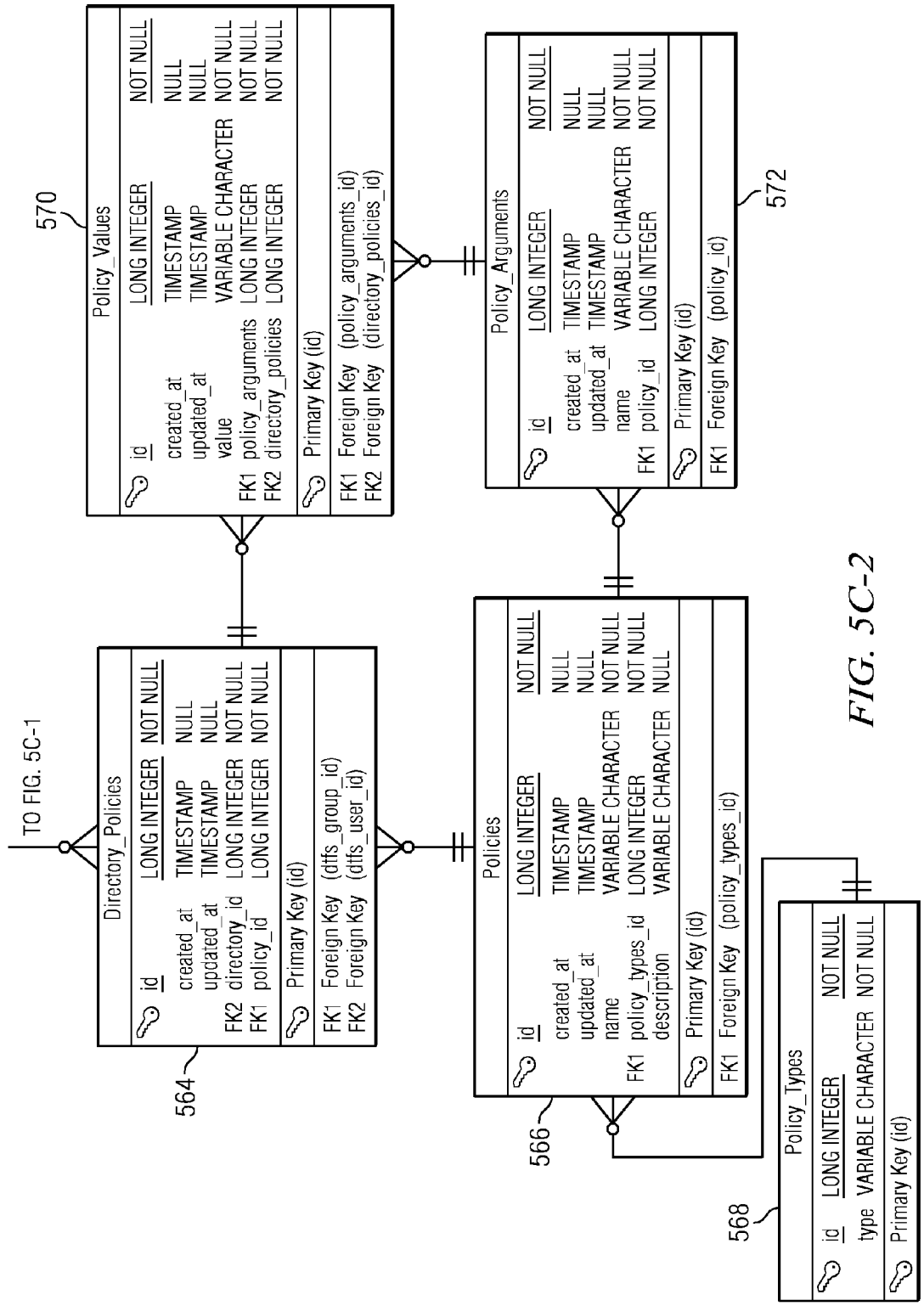

Turning to FIG. 5C one embodiment of a table schema for the storage of data relating to policies applicable to directories in an Archive Node is depicted. In this schema, there is nodes table 502, directory policies table 564, policies table 566, policy types table 568, policy values table 570 and policy arguments table 572. Entries in directory policies table 564 may be associated with polices to be applied to directories (and thus to files stored in those directories). Entries in directory policies table 564 may be linked to entries in node table 502 associated with a directory. In this manner, entries in directory policies table 564 associated with policies to be applied to directories may be linked to entries in nodes table 502 associated with a directory against which that policy is to be applied. It will be noted that a similar schema could be utilized to associate file policies with files, share policies with shares, etc.

Entries in directory policies table 564 may also be linked to an entry in policies table 566 that may be associated with a particular policy. Entries in policies table 566 may, in turn, be linked with an entry in policy types table 568 that is associated with a type of policy (for example, encryption or compression policy, number of copies to keep, replication, etc.). Thus, an entry in policies table 566 associated with a particular policy may be linked with an entry in policy type table 568 associated with the type of that policy.

Figure 5D:
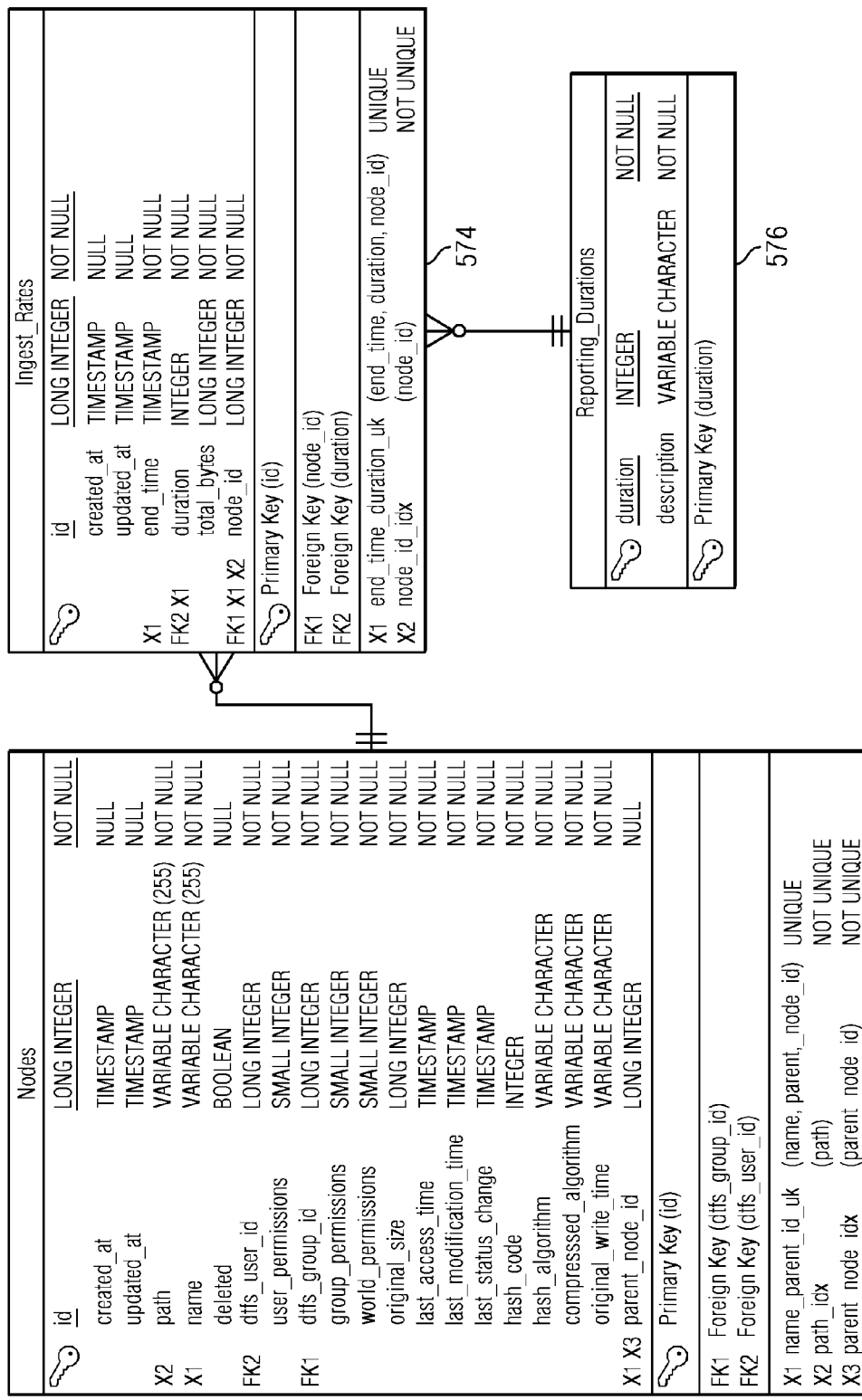

FIG. 5D depicts one embodiment of a table schema for collecting data on nodes in an Archive Node. In this schema, there is nodes table 502, ingest rates table 574 and reporting durations table 576. Thus, entries in the node table 502 can be linked to entries in ingest rates table 574 associated with statistics on the creation, reception, storage, migration, etc. of a file or directory.

FIG. 5 is provided by way of example and not limitation and the archive node appliance may store other metadata for files, directories, users, etc. According to one embodiment, for example, the FUSE file system may support extended attributes that are not used directly by the FUSE file system, but can be stored by clients and exposed through the FUSE file system. Extended attributes for a file or directory may be stored in the node table 502 for the file or directory other table. For example, a media management system may organize files based on the type of project with which the media is associated and therefore include an extended attributes such as project:soundtrack for files.

From a review of the above, it will be apparent that embodiments of such Archive Nodes may provide a highly effective manner of implementing a network based file system using a tape library. In some instances, however, it may be desired to provide a high level of availability or increased performance in conjunction with network based file systems. As such, in certain embodiments Archive Node Appliances may be clustered to provide increased performance or a higher degree of fault tolerance.

Figure 6:
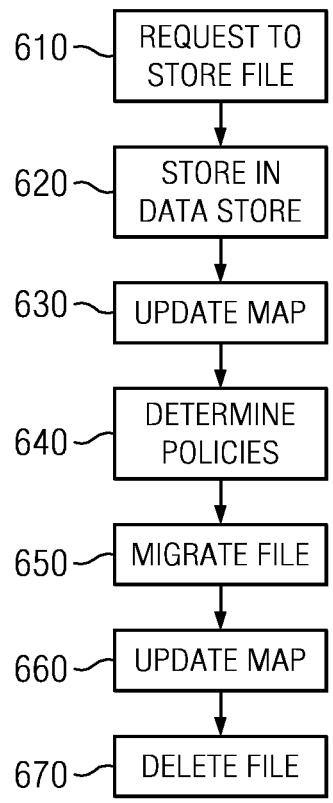
FIG. 6 is a flow chart illustrating one embodiment of a method for storing a file.

Referring now to FIG. 6, a method for storing a file using an embodiment of an Archive Node, including an Archive Node Appliance is depicted. At step 610 a request (which may comprise multiple commands in a file system protocol) to store a file may be received at the Archive Node Appliance, where the file may be associated with a name and a path as visible through the network based file system implemented by the Archive Node Appliance. For example, the path of the file may be path /patient_records and the file name may be Patient1.doc. The file is then stored on a location on the data store of the Archive Node Appliance at step 620, where the file may have a different name and be located at a path associated with the data store. For example, the path of the file as stored on the data store may be /data3 and the file name may be 550e8400-e29b-41d4-a716-446655440000.

In one embodiment, as discussed above, the file is stored in the data store according to one or more policies that apply to that file. For example, if a policy that applies to the file (for example, the policy is associated with the location associated with the network based file system where the file is stored) specifies that the file should be compressed the file may be compressed before the file is stored in the data store. Similarly, if an applicable policy specifies that the file is to be encrypted the file may be encrypted before it is stored in the data store.

The map can then be updated at step 630 to associate the name and the path of the file as visible through the network based file system with the path and name of the file as stored on the data store. Thus, in this example the path /patient_records and file name Patient1.doc, as visible through the network based file system is associated with the path /data3 and file name 550e8400-e29b-41d4-a716-446655440000 associated with the file as stored in the data store.

Subsequently, one or more policies to be applied to the file can be determined at step 640. The policies may be applied in conjunction with the migration of the file at step 650. As discussed above, in one embodiment one policy may specify that a migration timeout period is to be applied to the file before the file is migrated. This migration timeout period may specify a time period such that an amount of time equal to the migration timeout period may be allowed to elapse before the file is migrated. Thus, if such a policy exists the migration timeout period may be allowed to elapse before the file is migrated.

To migrate the file, one or more tapes on which to store the file may be determined. This determination may be based on the policies that have been determined to apply to that file. For example, the number of tapes determined may be based on a policy specifying that the file is to be maintained on multiple tapes. If so, two different tapes on which to store the file may be determined. If a policy to apply to the file specifies that the file is to be encrypted a tape comprising encrypted data may be selected. Similarly, if a policy to apply to the file specifies that the file is to be compressed a tape comprising compressed data may be selected. Assume for purposes of example that the tape on which it is determined to store the file has a TapeID of AN02394.

Each of the tapes on which it is determined to store the file can then be loaded into a drive, if it is not already in a drive, and the LTFS file system mounted. Specifically, the tape may be located using the index that maintains the location of each of the tapes in the library and loaded into a drive. The file can then be copied from its location on the data store to a location on the tape. In one embodiment, a path that corresponds to the path of the file as visible through the network based file system may be created on the tape using the LTFS file system if it does not already exist. The file can then be saved using the name that corresponds to the name of the file as visible through the network based file system. Continuing with the above example, the path /patient_records may be created on the tape having TapeID AN02394 if it does not exist and the file may be saved as Patient1.doc on this tape.

In one embodiment, before or during the copying of the file to the mounted LTFS file system on the tape, actions may be taken to implement policies applicable to the file. For example, if a policy specifies that the file is to be replicated it may be sent to another Archive Node Appliance or if a policy that applies to the file specifies that the file should be compressed, the Archive Node Appliance can cause the file to be stored on a compressed tape. Similarly, if an applicable policy specifies that the file is to be encrypted the Archive Node Appliance can cause the file to be stored on an encrypted tape.

The map can then be updated at step 660 to associate the tape on which the file is stored, the name and the path of the file as visible through the network based file system, the path and name of the file as stored in the data store and the path and name of the file as stored on the tape. Thus, in this example the path /patient_records and file name Patient1.doc, as visible through the network based file system is associated with TapeID AN02394, the path /data3 and the file name 550e8400-e29b-41d4-a716-446655440000 associated with the file as stored in the data store.

At step 670 the file, or portions thereof, may be deleted from the data store. In some embodiments, as it is desired to maintain the first portion of a file in a read cache in the data store, all portions of the file except this first portion may be deleted from the data store. It will be noted therefore, that in certain embodiments, the path and name of the file in the map that is associated with the file as stored in the data store may describe the location of the first portion of the file stored in the read cache. The steps of FIG. 6 can be repeated as needed or desired.

When an LTFS file system writes files to the tape, it will store sufficient metadata for an LTFS file system to describe the files (e.g., to an operating system). However, the regular attributes stored by the LTFS file system would be inadequate to describe the tape for purposes of the FUSE file system. Thus, if a tape is transferred from one archive node appliance to another, the files could be read by the archive node appliance. However, using the LTFS regular attributes alone, the FUSE file system of the second archive node appliance would have inadequate information to present the files to the operating system (and through the network file system interface) in the same manner as the FUSE file system of the originating archive node appliance because the second archive node appliance would lack the appropriate DTFS metadata. Consequently, there is a need for self-describing tapes that includes sufficient information for the FUSE file system of one archive node appliance to properly describe files stored by another archive node appliance.

Accordingly, an archive node appliance can write DTFS file, directory and other metadata (such as metadata depicted in FIGS. 5A-D) to the tape for the files stored on the tape. According to one embodiment, the DTFS metadata may be written as extended attributes on files and directories of the LTFS tape. According to another embodiment, the DTFS metadata may written as a file to the tape.

Turning first to the use of extended attributes, extended attributes are a feature of many file systems, including LTFS. In general, extended attributes are attributes that enable users to associate computer files with metadata that the file system does not interpret, unlike regular attributes which have a purpose specifically defined by the file system. Extended attributes are often stored as name/value string pairs and associated with files or directories.

Because extended attributes are user definable, DTFS metadata can be stored as LTFS extended attributes on the tape. In general, the DTFS metadata can be written as extended attributes in any manner that is supported by the tape file system. Metadata which corresponds to files or directories can be stored as extended attributes directly on those files, metadata which corresponds to directories can be stored as extended attributes on the directories of the LTFS file system and metadata which corresponds to the entire tape can be stored as extended attributes on the root directory of the tape.

The tape file system may place limits on the ability to define extended attributes. For example, one limitation of some embodiments, is that extended attributes must reside in an appropriate namespace in order for the file system to write the extended attributes. In some implementations of LTFS for example, extended attributes may only be written into the "user" namespace (including a nested namespaces). Therefore, according to one embodiment, DTFS metadata may be stored in a designated name space such as user.dtfs. Furthermore, the extended attributes have to meet other formal requirements of the file system, such as name length, string size, character encoding etc.

For purposes of explanation, the extended attributes can be classified as basic information, which applies to the entire tape, file nodes metadata, which applies to files, and directories metadata, which includes any metadata associated with directories on a tape. Turning first to basic information, examples of basic information include an identification of the system that most recently synced the tape (e.g., the serial number of the archive node appliance that most recently synced the tape.) Using the namespace discussed above, an example of an extended attributed may be:

"user.dtfs.mostrecentapplianceSN:000001"

Another example of basic information metadata may include an active directory domain if files on the tape were stored by a system that was part of an active directory domain. An example of such an extended attribute may be:

"user.dtfs.ArchiveDirectoryRealm:COMMSTOR.Company.com"

Turning to individual files on the tape, the files can be stored with the same directory and file names as presented by the FUSE file system and over the network file system interface. File node metadata and directories metadata are attached directly to the files and directories, respectively. For a file or directory, attributes from the corresponding row in nodes table 502 can be attached to the file or directory as extended attributes. Table 1 below provides examples of information from the DTFS database mapped to settings for file node extended attributes (string length, data format):

TABLE 1

| Information from the Database | | LTFS Information | |
| --- | --- | --- | --- |
| | | Typical Xattr | Extended |
| Nodes table column | Database Data Type | String Value Length | Attribute Data Format |
| deleted | Boolean | 1 | t or f |
| original_size | Bigint | 13 | Unsigned Int |
| last_access_time | timestamp with time zone | 29 | Date as String |
| last_modification_time | timestamp with time zone | 29 | Date as String |
| last_status_change | timestamp with time zone | 29 | Date as String |
| hash_code | Bytea | 128 | Hexidecimal |
| hash_algorithm | 255 char string | 6 | String |

TABLE 1-continued

| Information from the Database | | LTFS Information | |
| --- | --- | --- | --- |
| | | Typical Xattr | Extended |
| Nodes table column | Database Data Type | String Value Length | Attribute Data Format |
| compressed_algorithm | 255 char string | 0 | String |
| user_permissions | Smallint | 1 | Unsigned Int 0..7 |
| group_permissions | Smallint | 1 | Unsigned Int 0..7 |
| world_permissions | Smallint | 1 | Unsigned Int 0..7 |
| dtfs_user_id | Bigint | 1-6 | Unsigned Int |
| dtfs_group_id | Bigint | 1-6 | Unsigned Int |

One example embodiment of a file node attribute is shown below:

user.dtfs.original_size:1024

It can be noted that, in this example, the extended attribute name matches the attribute name in the database to make for simple mapping between database entries and extended attributes. In other embodiments, the extended attribute name may differ from the metadata name in the DTFS database, with the archive node maintaining a mapping between DTFS attribute names and extended attribute names.

Table 1 is provided by way of example, and other DTFS metadata may be mapped to extended attributes as needed or desired. Furthermore, the length and data types of the extended attributes may be set as needed or desired. Thus, for example, while the database field is set to null, the database field may have a non-zero length in other embodiments.

For each directory on the tape, the name of the directory from the nodes table 502 can be used as the name of the directory on the tape. Database attributes from the corresponding row in nodes table 502 can be attached to the directory as extended attributes. Table 2 below provides examples of information from the DTFS database mapped settings for directory extended attributes (string length, data format):

TABLE 2

| Information from the Database | | LTFS Information | |
| --- | --- | --- | --- |
| | | | Extended |
| Nodes Table Column | Data Type | Typical String Value Length | Attribute Data Format |
| deleted | Boolean | 1 | t or f |
| original_size | Bigint | 13 | Unsigned Int |
| last_access_time | timestamp with time zone | 29 | Date as String |
| last_modification_time | timestamp with time zone | 29 | Date as String |
| last_status_change | timestamp with time zone | 29 | Date as String |
| user_permissions | smallint | 1 | Unsigned Int 0..7 |
| group_permissions | smallint | 1 | Unsigned Int 0..7 |
| world_permissions | smallint | 1 | Unsigned Int 0..7 |
| dtfs_user_id | bigint | 1-6 | Unsigned Int |
| dtfs_group_id | bigint | 1-6 | Unsigned Int |

An example of a directory attribute according to one embodiment may be:

"user.dtfs.group_permissions:777"

Table 2 is provided by way of example, and other DTFS metadata may be mapped to extended attributes as needed or desired. Furthermore, the length and data types of the extended attributes may be set as needed or desired. Again, the extended attribute names and DTFS attribute names may match or be mapped to each other.

DTFS may provide for its own extended attributes which can also be mapped to extended attributes of the LTFS. Consequently, for a file, there may exist information in the database (e.g., rows in the table) which represents client provided metadata not directly used by the FUSE file system. Using the example in which a media system provides metadata such as project:music for files, the DTFS extended attribute can be stored as an LTFS extended attribute.

user.dtfs.attributes.linux.0.name.project:soundtrack

The FUSE file system may also maintain extended attributes on a file or directory that are internal to the DTFS. Examples may include, for example, "cachedtime," file retention policy or delayed action state. Internal extended attributes may also be written to the tape as LTFS extended attributes. One example of a form for writing internal extended attributes is:

user.dtfs.attributes.dtfs.attribut_name:attribute_value

Furthermore, user and group name mappings between FUSE file system users and groups and active directory SIDs may be stored as extended attributes of, for example, the root directory of the tape. An example extended attribute is shown below:

user.dtfs.ad.uid.1000000:S-1-5-21-17264431-51382897-1586563796-6869, jsmith

In this example, the portion of the attribute name uid.100000 represents the Unix Id of the user, the portion of the value string "S-1-5-21-17264431-51382897-1586563796-6869" represents the SID and the portion of the value string "jsmith" after the comma represents the name associated with the SID if known. In a similar manner, group ids can be mapped to active directory information as shown in the example below:

user.dtfs.ad.gid.1000001:S-1-5-32-100, Administrator where 1000001 represents the UNIX group ID, S-1-5-32-100 represents the active directory group SID and Administrator is the group name.

In the above examples, the DTFS database attribute names meet the length, naming criteria for LTFS extended attributes, allowing a one-to-one mapping. However, in some cases, DTFS attribute names may be longer that provided for by LTFS. This may be particularly true when users define DTFS extended attributes. Consequently, DTFS attributes name:value pairs may be split into multiple LTFS attributes. To provide one example, the DTFS extended attribute project:soundtrack may be stored as the two LTFS extended attributes:

user.dtfs.attributes.linux.0.name.project
    user.dtfs.attributes.linux.0.value.soundtrack This split can be done to allow for extended attribute value names longer than 255 characters (as may be supported by DTFS) and to overcome the limitation in LTFS that extended attribute names cannot include a colon. In other embodiments, it may not be necessary to split a DTFS extended attribute into two LTFS extended attributes.

Thus, according to one embodiment, an archive node appliance can maintain file system metadata for the FUSE file system that can be used by FUSE file systems to describe the file. When a file is stored on a tape using an LTFS file system, the archive node appliance can store metadata interpreted by the LTFS file system to describe the files (regular attributes) plus file system metadata used by the FUSE file system to describe the files. The FUSE file system metadata can be stored as extended attributes of the LTFS file system.

The metadata stored as extended attributes can be limited to the metadata attributes that do not overlap between the LTFS file system and FUSE file system. For example, if a file is stored on the tape with the same file name that is used to present the file by the FUSE file system, there is no need to store the filename in both the LTFS regular attributes and the LTFS extended attributes, though such duplicative attributes could be stored.

Figure 7:
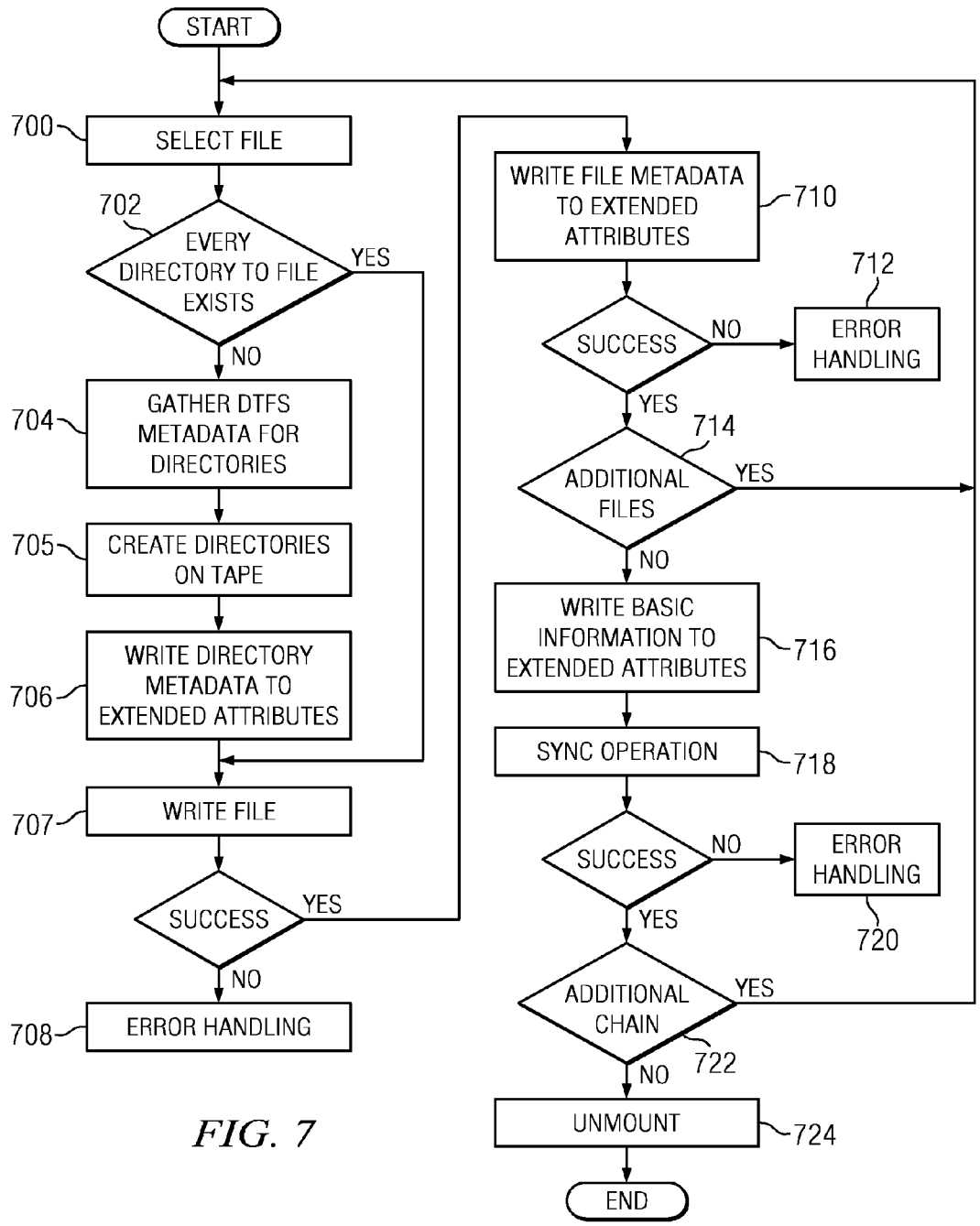
FIG. 7 is a flow chart illustrating one embodiment of a method for storing metadata of one file system on a tape using another file system.

FIG. 7 is a flow chart illustrating a more detailed embodiment of writing files to a tape. For purposes of explanation, a set of one or more file to be written to tape from the data store or memory are referred to as a "file chain." It is assumed for purpose of FIG. 7 that the appropriate media to which files are to be written is mounted in a drive.

At step 700, the archive node can select the first file to be written to the tape in a write chain and, at step 702, determine if every directory as exposed by the FUSE file system in the path to the file exists. Thus, for example, if the file is exposed by the FUSE file system as being available at UUID1/documents/document.txt, the archive node appliance will determine if the directories "UUID1" and "/documents" exist on the target tape. If the directories do not exist on the target tape, the metadata for all missing parent directory nodes of the file are gathered (e.g., from the DTFS database) (step 704). The directories can be created and the metadata from the FUSE file system stored in the extended attributes of the LTFS index in memory corresponding to the target media (steps 705, 706). According to one embodiment, metadata will not be added or modified for existing directories on tape.

When all the parent directories of the file are created and the DTFS metadata for the directories stored in the LTFS extended attributes, the selected file can be written to the tape (step 707). If the write is not successful, error handling can occur (step 708). If the write is successful, the DTFS metadata for the file can be written into the LTFS extended attributes for the tape (step 710). This can include writing regular attributes of the DTFS, extended attributes of the DTFS, SID/UID/GID mappings or other information stored as part of the file system metadata for the FUSE file system. If writing the FUSE file system metadata to the LTFS extended attributes is unsuccessful, error handling can occur (step 712). If the DTFS metadata is successfully written to the tape, the process can be repeated for each file in the file chain (represented at decision block 714).

When all the files in a file chain are written and the DTFS file metadata set as extended attributes, the archive node appliance can write the basic information metadata that applies to the entire tape as extended attributes of the root directory of the media (step 716). An LTFS sync operation can then be performed (step 718) to write the index file in memory to the media. If the sync is unsuccessful error handling can occur (step 720). If the sync is successful, the process can be repeated for each write chain (step 722). Multiple write chains may occur, for example, at different time periods. In other embodiments, the archive node appliance may create multiple write chains if there are a large number of files to be written to a media so that an LTFS sync occurs at multiple times before all the files are written. When writing to a tape is complete, the tape can be unmounted and the most recent index file copy stored from the most recent LTFS sync is stored as the index file on the tape (step 724). The steps of FIG. 7 can be repeated as needed or desired.

Accordingly, the tape may contain enough DTFS metadata for the files and directories so that a second archive node appliance can recreate the appropriate portions of the DTFS database for the files on the tape and the FUSE file system of the second archive node appliance can present the files in the same manner as the first archive node system with the appropriate users, permissions, etc. applied.

In addition to storing information that allows separate FUSE file systems to describe files on the tape in the same manner, the archive node appliance may store additional information to ensure data integrity and interoperability of the tape from one archive node appliance to another. One concern with data integrity is that a user may attempt to modify the contents of a tape with an unauthorized LTFS system. LTFS, however, records an index generation value every time the tape is synced. This index generation value is stored as part of the index on the tape. Once a sync is complete and/or prior to unmounting the tape, the archive node appliance can store the index generation value in MAM data in an onboard memory chip of the tape cartridge. In addition, LTFS also defines a volume UUID each time a tape is formatted. The archive node appliance can also store the UUID in the MAM data of the tape cartridge.

When an archive node appliance loads the tape, the archive node appliance can read the index generation value and volume UUID from the MAM data and the index generation value and volume UUID from the tape index. If the index values do not match, this indicates that the tape has been written to or changed by a system that is not aware of the index value in the MAM data. This at least indicates that the tape left the archive node appliance ecosystem and suggests that the tape was accessed and changed by an unauthorized system. When a discrepancy between the index generation value in the MAM data and index generation value in the tape index is detected, the archive node appliance may generate an alert or take other action. If the index generation values do match, the volume UUIDs from the MAM data and tape index can also be checked. If the volume UUIDs do not match, this can indicate that the tape was reformatted by an unauthorized system.

Another issue that may occur is that the metadata maintained by an archive node appliance for files, directories, users etc. may change over time such that files on the tape are stored using one generation of metadata whereas the archive node appliance accessing the tape uses another generation of metadata. To account for this possibility, a metadata version can be stored in the MAM data of the tape or as an extended attribute in the index of the tape. When an archive node appliance supporting a newer version of the DTSFS metadata writes to a tape having an older version of the DTFS metadata, the archive node appliance can update the metadata for each file and directory with the newer version of the DTFS metadata. When an archive node appliance supporting an older version of the DTFS metadata reads a tape having a newer version of the DTFS metadata, the archive node appliance can mark the tape as "read only," and populate its DTFS database with only the version 1 attributes on the tape to present the files on the tape through the FUSE system interface.

Figure 8:
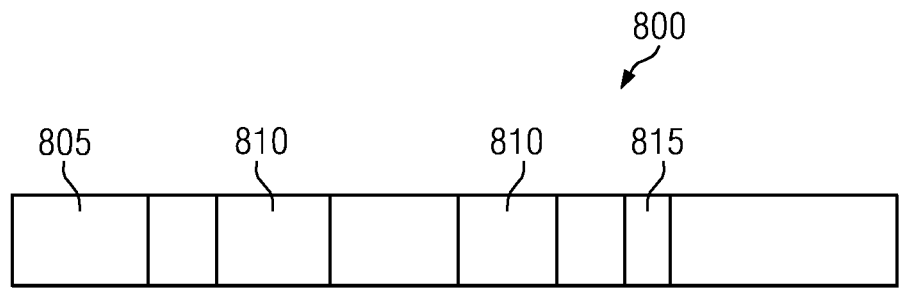
FIG. 8 is a flow chart illustrating one embodiment of data stored on a tape.

Advantages of storing DTFS metadata in the extended attributes of an LTFS tape can better understood in the context of FIG. 8, which provides a diagrammatic representation of one embodiment of data stored on a tape according to an LTFS system. The data on the tape 800 can include an index file 805 and file data 810 for other files (generally the non-index files of interest to end users, such as documents, etc.).

When a tape is mounted the index file 805 is read into memory for fast access. The extended attributes may be embodied as elements (e.g., XML elements) in index file 805. Consequently, the DTFS metadata will reside in memory for faster access. As files are changed, added, deleted, moved etc. the metadata for the files can be quickly updated in the index file RAM.

Furthermore, LTFS supports sync operations in which the current copy of the index file in RAM is written to tape (e.g., as index file copy 815). Consequently, the current copy of DTFS metadata for files written to tape can be stored as index file copy 815 from time to time as the tape is mounted. This helps preserve the state of the index in case of power failure or other error. When the tape is unmounted, the LTFS system stores the latest index file copy 815 as index file 805 thus Updating index file 805 with the most current DTFS metadata. When a tape is mounted, the LTFS system checks if the latest index file copy 815 matches index file 805. A discrepancy between the two can indicate some type of error, such as a power loss before the tape was unmounted. Such a discrepancy may lead to a mount error generated by the LTFS system. The archive node appliance can check for the mount failure and automatically run error recovery if required. For example, the archive node appliance can automatically cause the LTFS utility ltfsck to run to recover the media.

Figure 9:
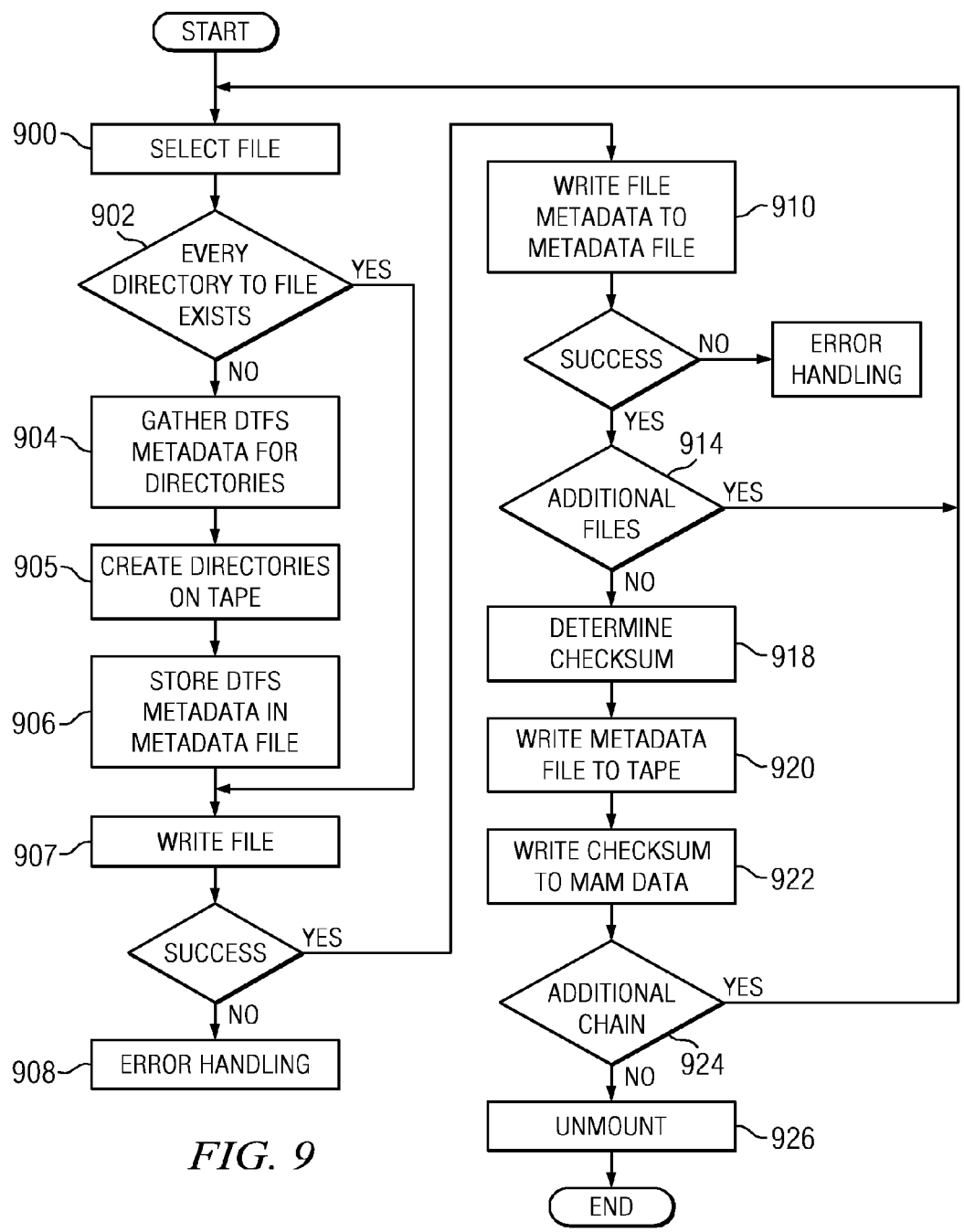
FIG. 9 is a flow chart illustrating another embodiment of storing metadata of one file system on a tape using another file system.

While it may be preferable to store DTFS metadata in the extended attributes of an LTFS tape, the DTFS metadata may also be stored as a separate metadata file on the tape separate from the LTFS index file. FIG. 9 is a flow diagram illustrating one embodiment of a method for storing DTFS metadata as a file on the tape. It is assumed for purpose of FIG. 9 that the appropriate media to which a file is to be written is mounted in a drive.

At step 900, the archive node can select the first file to be written to the tape in a write chain and, at step 902, determine if every directory as exposed by the FUSE file system in the path to the file exists. Thus, for example, if the file is exposed by the FUSE file system as being available at UUID1/documents/document.txt through the network file system interface, the archive note appliance will determine if the directories "UUID1" and "/documents" exist on the target tape. If the directories do not exist on the target tape, the metadata for all missing parent directory nodes of the file are gathered (e.g., from the DTFS database) and stored in a metadata file in memory 904. The directories can be created on the tape (step 905) and the DTFS metadata for the directories written to a metadata file in memory (step 906).

When all the parent directories of the file are created, the selected file can be written to the tape (step 907). If the write is not successful, error handling can occur (step 908). If the write is successful, the DTFS metadata for the file can be written into the metadata file (step 910). This can include writing standard attributes of the DTSFS, extended attributes of the DTFS, SID/UID/GID mappings or other information stored as part of the file system metadata for the FUSE file system. The process can be repeated for each file in the file chain (represented at decision block 914).

When all the files in a file chain are written, the archive node appliance can generate a checksum of the metadata file (step 918). The metadata file can be written to the tape (step 920) and the checksum to the cartridge MAM data (step 922). The checksum can be used when a tape is loaded to determine if the metadata file has been altered. If there are multiple file chains (as represented by step 924) the process can be repeated, altering the metadata file to account for the new files and altering the checksum in MAM. When all the file chains are written and the metadata file and checksums updated to account for all the file chains, the tape can be unmounted. The steps of FIG. 9 can be repeated as needed or desired.

In the above embodiment, the metadata file is written to the tape when there are no files left in a file chain. However, in other embodiments, the metadata file may be updated on the tape periodically and corresponding checksum updated in MAM.

In the above examples, the DTFS file system metadata is written to the tape, either as part of the LTFS extended attributes or as a metadata file separate from the LTFS index file. As memory becomes cheaper, however, tape cartridges may include larger amounts of MAM data. Consequently, the DTFS file system metadata may also be stored in MAM. Furthermore, while in the above examples, index generation values, metadata version numbers and metadata file system checksums are described as being written to MAM data, in other examples they may be written to the tape.

Thus, embodiments described herein can maintain a set of metadata for a file to describe the file according to a first type of file system (e.g., the FUSE file system). The file can be presented (e.g., to the local operating system, network hosts or others) as being a particular location based on the metadata used by the first type of file system. When the file is stored on a tape, the file can be stored in a location that mirrors the first location using a second type of file system (e.g., LTFS or other tape file system). Metadata used by the second type of file system to describe the files will generally be stored on the tape as regular file system attributes as part of this process. In addition, embodiments described herein can store metadata used by the first type of file system (e.g., the FUSE file system) to describe the file so that the file can be properly presented according to the first type of file system on the different machine, with the file associated with the appropriate policies, users, etc.

When a tape is imported to a new archive node appliance, the archive node appliance can read the index and determine if it already has entries for the files and directories on the tape in its database. If not, the archive node appliance can create new database entries for the directories and files using the metadata in the index file and/or separate metadata file. Consequently, the FUSE file system of the second archive node appliance can present to the files in a similar manner to the network file system interface as the FUSE file system of the first archive node appliance.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for providing a self-describing tape comprising:
    a media library, comprising:
        a set of drives, and
        a set of tapes; and
    an archive node appliance coupled to the media library and a set of hosts, the archive node appliance comprising a processor, a data store and a set of computer instructions executable on the processor to:
    store a file in the data store at a third location using a first file system of a first file system type and maintain, for the file, a set of first file system metadata according to the first file system;
    present the file as located at a first location according to the set of first file system metadata using the first file system;
    cause the file to be stored at a second location on a tape of the media library using a second file system of a second file system type, wherein the second location mirrors the first location;
    cause at least a portion of the set of first file system metadata to be stored on the tape in addition to a set of second file system metadata stored by the second file system, wherein the at least a portion of the set of first file system metadata is stored in a metadata file; and
    calculate a checksum of the metadata file and store the checksum in media auxiliary memory (MAM) data of a tape cartridge.

2. The system of claim 1, wherein causing at least a portion of the set of first file system metadata to be stored on the tape comprises causing the at least a portion of the set of first file system metadata to be stored as extended attributes according to the second file system.

3. The system of claim 1, wherein the second file system is a linear tape file system (LTFS) and wherein causing the second file system to store the at least a portion of the set of first file system metadata comprises setting extended attributes in an index file for the LTFS tape when the index file is in memory.

4. The system of claim 3, wherein the set of first file system metadata includes a user identifier of a user that accessed the file through the first file system.

5. The system of claim 1, wherein the set of computer instructions are further executable to:
    determine that a second tape in a drive of the media library includes a second file stored by another archive node appliance;
    determine a set of first file system metadata for the second file from information read from the second tape;
    present the second file according to the first file system metadata for the second file.

6. The system of claim 5, wherein the step of determining the set of first file system metadata for the second file comprises reading the set of first file system metadata from extended attributes of file system metadata for the second file system type.

7. The system of claim 1, wherein the presenting the file as located at the first location comprises presenting the file over a network file system interface.

8. A computer program product comprising a non-transitory computer readable medium comprising a set of computer instructions, the instructions for:

storing a file in a data store at a third location using a first file system of a first file system type and maintaining, for the file, a set of first file system metadata according to the first file system;

presenting the file as located at a first location different than the third location according to the set of first file system metadata using the first file system;

causing the file to be stored at a second location on a tape of a media library using a second file system that is a second file system type, wherein the second location mirrors the first location;

causing at least a portion of the set of first file system metadata to be stored on the tape in addition to a set of second file system metadata stored by the second file system, wherein the at least a portion of the set of first file system metadata is stored in a metadata file; and calculating a checksum of the metadata file and storing the checksum in media auxiliary memory (MAM) data of a tape cartridge.

9. The computer program product of claim 8, wherein causing at least a portion of the set of first file system metadata to be stored on the tape comprises causing the at least a portion of the set of first file system metadata to be stored as extended attributes according to the second file system.

10. The computer program product of claim 8, wherein the second file system is a linear tape file system (LTFS) and wherein causing the at least a portion of the set of first file system metadata to be stored on the tape comprises setting extended attributes in an index file for the LTFS tape when the index file is in memory.

11. The computer program product of claim 8, wherein the at least a portion of the set of first file system metadata includes a user identifier of a user that accessed the file through the first file system.

12. The computer program product of claim 8, wherein the set of computer instructions are further executable for:

determining that a second tape in a drive of the media library includes a second file stored by another system;

determining a set of first file system metadata for the second file from information read from the second tape;

presenting the second file according to the first file system metadata for the second file.

13. The computer program product of claim 12, wherein the step of determining the set of first file system metadata for the second file comprises reading the set of first file system metadata from extended attributes of file system metadata for the second file system type.

14. A method comprising:

storing a file in a data store at a third location using a first file system of a first file system type and maintaining, for the file, a set of first file system metadata according to the first file system;

presenting the file as located at a first location according to the set of first file system metadata using the first file system;

causing the file to be stored at a second location on a tape of a media library using a second file system that is a second file system type, wherein the second location mirrors the first location;

causing at least a portion of the set of first file system metadata to be stored on the tape in addition to a set of second file system metadata stored by the second file system, wherein the at least a portion of the set of first file system metadata is stored in a metadata file; and calculating a checksum of the metadata file and storing the checksum in media auxiliary memory (MAM) data of a tape cartridge.

15. The method of claim 14, wherein causing at least a portion of the set of first file system metadata to be stored on the tape comprises causing the at least a portion of the set of first file system metadata to be stored as extended attributes according to the second file system.

16. The method of claim 14, wherein the second file system is a linear tape file system (LTFS) and wherein causing the at least a portion of the set of first file system metadata to be stored on the tape comprises setting extended attributes in an index file for the LTFS tape when the index file is in memory.

17. The method of claim 14, wherein the at least a portion of the set of first file system metadata includes a user identifier of a user that accessed the file through the first file system.

18. The method of claim 14, further comprising:

determining that a second tape in a drive of the media library includes a second file stored by another system;

determining a set of first file system metadata for the second file from information read from the second tape;

presenting the second file according to the first file system metadata for the second file.

19. The method of claim 18, wherein the step of determining the set of first file system metadata for the second file comprises reading the set of first file system metadata from extended attributes of file system metadata for the second file system type.

* * * * *